US008087170B2

(12) United States Patent
Sakurai et al.

(10) Patent No.: US 8,087,170 B2

(45) Date of Patent: Jan. 3, 2012

(54) DEVELOPING AGENT CARRIER MANUFACTURING METHOD, DEVELOPING AGENT CARRIER, DEVELOPING DEVICE AND IMAGE FORMING APPARATUS

(75) Inventors: Noboru Sakurai, Chino (JP); Yoichi Yamada, Shiojiri (JP); Junichi Nakahara, Fujimi-machi (JP); Masanao Kunugi, Fujimi-machi (JP); Tomohiro Aruga, Shiojiri (JP); Katsumi Okamoto, Azamimo (JP)

(73) Assignee: Seiko Epson Corporation, Tokyo (JP)

( * ) Notice: Subject to any disclaimer, the term of this patent is extended or adjusted under 35 U.S.C. 154(b) by 1189 days.

(21) Appl. No.: 11/561,213

(22) Filed: Nov. 17, 2006

(65) Prior Publication Data

US 2007/0147906 A1 Jun. 28, 2007

(30) Foreign Application Priority Data

Nov. 17, 2005 (JP) ................................. 2005-333427
Nov. 17, 2005 (JP) ................................. 2005-333428
Nov. 17, 2005 (JP) ................................. 2005-333429

(51) Int. Cl.
*A01B 29/00* (2006.01)

(52) U.S. Cl. ................. 29/895.3; 29/895.31; 29/895.22; 492/30; 492/31

(58) Field of Classification Search ............... 29/895.22, 29/895.3, 895.31, 895.33; 492/28, 30, 31, 492/33, 17
See application file for complete search history.

(56) References Cited

U.S. PATENT DOCUMENTS 4,029,249 A * 6/1977 Nagel et al. ..................... 226/95
4,159,633 A * 7/1979 Linne .............................. 72/198
5,548,897 A * 8/1996 Link .......................... 29/895.32
5,753,348 A * 5/1998 Hatakeyama et al. ..... 428/195.1
6,785,494 B2 8/2004 Yamanoi et al.
7,174,124 B2 2/2007 Ishibashi et al.
2003/0202825 A1 10/2003 Yamada et al.
2005/0050728 A1* 3/2005 Fukuyama ...................... 29/895

FOREIGN PATENT DOCUMENTS

JP 61147264 A 7/1986
JP 11242392 A 9/1999
JP 11258903 A 9/1999
JP 2000227111 A 8/2000
JP 2002278296 A 9/2002
JP 2002301411 A 10/2002
JP 2003029526 A 1/2003
JP 2003208012 A 7/2003
JP 2003-263018 9/2003
JP 2004126335 A 4/2004
JP 2004205883 A 7/2004
JP 2005024682 A 1/2005

* cited by examiner

*Primary Examiner* — David Bryant
*Assistant Examiner* — Christopher Besler
(74) *Attorney, Agent, or Firm* — DLA Piper LLP (US)

(57) ABSTRACT

A method for manufacturing a developing agent carrier of a hollow or solid cylindrical shape having an outer peripheral surface and an irregularity section formed on the outer peripheral surface to carry a developing agent is provided. The method comprises a step of preparing a base material of a hollow or solid cylindrical shape which is to become the developing agent carrier, the base material having an outer peripheral surface; and a step of forming the irregularity section by pressing dice for formation of the irregularity section against the outer peripheral surface of the base material. The irregularity section forming step comprises a first step of forming a plurality of first depression portions on the outer peripheral surface of the base material by use of a die and a second step of forming a plurality of second depression portions on the outer peripheral surface of the base material by use of a die identical with or different from the die used in forming the first depression portions, in such a manner that the second depression portions are dislocated from the first depression portions.

18 Claims, 13 Drawing Sheets

DEVELOPING AGENT CARRIER MANUFACTURING METHOD, DEVELOPING AGENT CARRIER, DEVELOPING DEVICE AND IMAGE FORMING APPARATUS

CROSS-REFERENCE TO RELATED APPLICATION

This application claims priorities to Japanese Patent Applications No. 2005-333427, No. 2005-333427 and No. 2005-333429 all filed on Nov. 17, 2005, which are hereby expressly incorporated by reference herein in their entirety.

BACKGROUND

1. Field of the Invention

The present invention relates to a developing agent carrier manufacturing method, a developing agent carrier, a developing device and an image forming apparatus, and in particular relates to a developing agent carrier manufacturing method, a developing agent carrier manufactured by the method, a developing device provided with the developing agent carrier and an image forming apparatus provided with the developing device.

2. Description of the Prior Art

Image forming apparatuses such as a printer, a copier and a facsimile, which take advantage of electrophotography, are adapted to form a toner image on a recording medium, e.g. a paper, through a series of image forming processes including an electrifying step, an exposure step, a developing step, a transfer step, a fixing step and the like.

Such image forming apparatuses are provided with a developing device arranged to face a photosensitive body carrying an electrostatic latent image and having a developing roller (developing agent carrier) for carrying toner. The developing device converts the latent image to a toner image and visualizes the same by applying the toner from the developing roller to the photosensitive body in the developing step.

Conventionally known examples of the developing roller employed in such a developing device include a developing roller of the type having an outer peripheral surface roughened into irregularities by blast treatment (see, e.g., JP-A2003-263018). This blast treatment enables the developing roller to carry the toner reliably.

However, since the irregularities are formed by the blast treatment in the developing roller disclosed in the afore-mentioned prior art reference, it is often the case that the irregularities thus formed become uneven in shape, size and distribution, thereby degrading development characteristics.

Taking a specific example, the distribution of the quantity of the toner carried on the outer peripheral surface of the developing roller may be uneven in some cases, and the tumbling capability (ease of tumbling movement) of toner particles on the outer peripheral surface of the developing roller may grow non-uniform in another case. For this reason, it is often the case that defective electrification or poor conveyance of the toner occurs locally at the time when the toner on the developing roller is frictionally electrified by means of a restriction blade. As a consequence, defective development such as a so-called “fog” or the like takes place.

Further, the irregularities formed by the blast treatment have protrusion portions whose tip end is relatively sharp. Therefore, the irregularities are apt to wear out by the contact with the restriction blade or the like, which means that the developing roller of the afore-mentioned prior art reference suffers from reduced durability.

Furthermore, in order to make the conveyance ability of the toner excellent by the irregularities on the outer peripheral surface of the developing roller, it is preferred that a pitch between the depressions or ridges of the irregularities is set to be lower than 100 mm or less.

Moreover, a demand has existed for a method by which the irregularities on an outer peripheral surface of a developing roller can be set into a desired arbitrary shape.

In addition, in general, for the purpose of reducing a weight, a developing roller includes a main body formed from a hollow cylindrical shape member, and flange members having rotation shafts which are rotatably supported by shaft bearing means are respectively fitted or pushed into openings provided on both the ends of the cylindrical shape member in such a developing roller, formation of the irregularities is carried out after the flange members have been fitted into the openings of the cylindrical shape member so that the axes of rotation shafts of the flange members are aligned with each other. However, such a hollow cylindrical shape member as described above is likely to be deformed as compared with a solid cylindrical shape member (rod-like member) due to its reduced rigidity. Further, rigidity differs between the end portions of the cylindrical shape member in which the flange members are respectively fitted and a portion other than the end portions. For these reasons, it was difficult to form the irregularities uniformly on the outer peripheral surface of the developing roller. Furthermore, if the cylindrical shape member is deformed, contacting pressure between the developing roller and the restriction blade changes, thus leading to the case that defective electrification or poor conveyance of the toner occurs.

SUMMARY

Accordingly, it is an object of the present invention to provide a developing agent carrier manufacturing method that can manufacture a developing agent carrier with enhanced durability and excellent development characteristics, a developing agent carrier manufactured by the method, a developing device provided with the developing agent carrier and an image forming apparatus incorporating the developing device.

With these objects in mind, the present invention is directed to a method for manufacturing a developing agent carrier of a hollow or solid cylindrical shape having an outer peripheral surface and an irregularity section formed on the outer peripheral surface to carry a developing agent. The method comprises: a step of preparing a base material of a hollow or solid cylindrical shape which is to become the developing agent carrier, the base material having an outer peripheral surface; and a step of forming the irregularity section by pressing dice for formation of the irregularity section against the outer peripheral surface of the base material, wherein the irregularity section forming step comprises a first step of forming a plurality of first depression portions on the outer peripheral surface of the base material by use of a die and a second step of forming a plurality of second depression portions on the outer peripheral surface of the base material by use of a die identical with or different from the die used in forming the first depression portions, in such a manner that the second depression portions are dislocated from the first depression portions.

According to the developing agent carrier manufacturing method of the present invention mentioned above, it is possible to form an irregularity section of a regular and uniform pattern on the outer peripheral surface of the developing agent carrier. The developing agent carrier thus obtained allows a uniform and optimum quantity of developing agent to be carried on the outer peripheral surface thereof. Moreover, the tumbling capability (ease of tumbling movement) of the developing agent on the outer peripheral surface of the developing agent carrier becomes uniform. As a result, it is possible to avoid local poor electrification or local poor conveyance of the developing agent, thereby enhancing the developing characteristics.

Furthermore, since dice are used in forming the irregularity section, it is possible to ensure that the protrusion portions of the irregularity section thus obtained have tip ends of a relatively large width, unlike the irregularities obtained through blast treatment. Such an irregularity section exhibits excellent mechanical strength. In particular, due to the fact that the regions pressed by the dice has enhanced mechanical strength, the resultant irregularity section shows greater mechanical strength than the one obtained by other treatment such as cutting work or the like. The developing agent carrier having such an irregularity section can enjoy increased durability. In addition, if the protrusion portions of the irregularity section have tip ends of a relatively large width, they undergo little change in shape even when worn out. This prevents any rapid degradation of developing characteristics and makes it possible to assure excellent developing characteristics for a prolonged period of time.

In the developing agent carrier manufacturing method of the present invention, it is preferred that the second depression portions are formed between the first depression portions.

With this structure, since the second depression portions are formed between the first depression portions, it is possible to form the irregularity section having extremely fine irregularities having sizes substantially equal to or smaller than those obtained by blast treatment. As a result, the thus obtained developing roller can have improved tumbling capability (ease of tumbling movement) of toner particles on the outer peripheral surface of the developing roller. Further, such a developing roller can carry toner of an extremely uniform amount and achieve extremely excellent electrification and conveyance of the toner.

Further, in the developing agent carrier manufacturing method described above, it is also preferred that the die used in forming the first depression portions is identical with the die used in forming the second depression portions.

The helps to cut down the costs incurred in connection the dice.

Further, in the developing agent carrier manufacturing method described above, it is also preferred that the die used in forming the first depression portions differs from the die used in forming the second depression portions, a plurality of projection portions for formation of the first depression portions are formed at a first pitch on the die used in forming the first depression portions, and a plurality of projection portions for formation of the second depression portions are formed at a second pitch n times or 1/n times greater than the first pitch on the die used in forming the second depression portions, where the "n" is a natural number.

According to this manufacturing method, by appropriately combining the shape of the die for formation of the first depression portions and the shape of the die for formation of the second depression portions, it becomes possible to form the irregularity section into a desired shape and also to increase the degree of design freedom of the irregularity section obtained.

Further, in the developing agent carrier manufacturing method described above, it is also preferred that the irregularity section is comprised of a plurality of first grooves extending in a mutually parallel relationship and a plurality of second grooves intersecting the first grooves and extending in a mutually parallel relationship.

This makes it possible to readily form an irregularity section of a regular and uniform pattern through the use of dice of a relatively simple shape.

Further, in the developing agent carrier manufacturing method described above, it is also preferred that if the pitch between the first grooves and the pitch between the second grooves are defined as "P", the P is smaller than the pitch of a resolving power employed.

This makes it possible for the developing agent carrier to prevent a toner image obtained by development from becoming uneven.

Further, in the developing agent carrier manufacturing method described above, it is also preferred that if the depth of the first grooves and the second grooves is defined as "D" and if the average particle size of the developing agent is defined as "d", D/d is equal to 0.5 to 2.

This makes it possible for the developing agent carrier to carry the developing agent on the irregularity section in a uniform and optimal quantity.

Further, in the developing agent carrier manufacturing method described above, it is also preferred that if the width of the first grooves and the second grooves is defined as "W" and if the average particle size of the developing agent is defined as "d", W/d is equal to 2 to 20.

This makes it possible for the developing agent carrier to carry the developing agent on the irregularity section in a uniform and optimal quantity.

In the developing agent carrier manufacturing method of the present invention, it is also preferred that the second depression portions are partially overlapped with the first depression portions.

With this structure, since the irregularity section is formed such that the second depression portions are partially overlapped with the first depression portions, it is possible to properly set the shape, size, depth and the overlapping amount between the first depression portions and the second depression portions, without having to use a die of a complex shape. This makes it possible to arbitrarily select the shape of an irregularity section and to obtain an irregularity section exhibiting desired characteristics.

Further, in the developing agent carrier manufacturing method described above, it is also preferred that the second depression portions are formed after the formation of the first depression portions in the irregularity section forming step and the second depression portions are smaller in depth than the first depression portions.

This makes it possible to form an irregularity section having stairs (a multilevel groove structure). Such an irregularity section allows the developing agent to move into and out of the depression portions with ease, thereby improving the tumbling capability of the developing agent. This also makes it possible to reduce the pressing force required in the second step, enabling the irregularity section to be formed with ease.

Another aspect of the present invention is directed to a developing agent carrier manufactured by the manufacturing method of the present invention described above.

The developing agent carrier thus manufactured is excellent in developing characteristics and durability.

A further aspect of the present invention is directed to a developing device provided with the developing agent carrier described above, the developing agent carrier arranged in contact with or in proximity with a latent image carrier for carrying a latent image in a confronting relationship, the developing device adapted to visualize the latent image as a developing agent image by applying a developing agent from the developing agent carrier to the latent image carrier.

The developing device of this configuration is excellent in developing characteristics and durability.

A still further aspect of the present invention is directed to a method for manufacturing a developing agent carrier of a hollow cylindrical shape having an outer peripheral surface and an irregularity section formed on the outer peripheral surface to carry a developing agent. The method comprises a step of fitting respectively flange members into openings defined by inner circumferential surfaces at both end portions in an axial direction of a base material of a hollow cylindrical shape which is to become the developing agent carrier; and a step of forming the irregularity section by pressing dice for formation of the irregularity section against an outer peripheral surface of the base material, wherein a region in which the irregularity section is formed is a portion of the outer peripheral surface of the base material which extends from a contacting part between the inner circumferential surface of the base material and the outer circumferential surface of each of the flange members toward a central portion of the base material in the axial direction thereof.

According to the developing agent carrier manufacturing method of the present invention mentioned above, the irregularity section is formed on the region of the outer peripheral surface of the base material other than portions of the base material having high rigidity due to the support by the flange members from the inside thereof, that is, the irregularity section is formed on the region of the outer peripheral surface of the base material having relatively uniform rigidity, Therefore, it is possible to suppress localized or sudden changes in the amount of deformation of the base material, when the outer peripheral surface of the base material is pressed with the dies. As a result, it is possible to form the irregularity section having uniform irregularities on the outer peripheral surface of the base material. Further, it is also possible to provide a developing roller having excellent properties by preventing deformation (plastic deformation) of the base material.

In this developing agent carrier manufacturing method described above, it is also preferred that the contacting part between the inner circumferential surface of the base material and the outer circumferential surface of each of the flange members has an inner annular edge portion, wherein the irregularity section includes a number of depression portions in which a depression portion closest to each of the flange members has a side surface positioned on the side of the corresponding flange member, and wherein each of the closest depression portions is formed at a position on the outer peripheral surface of the base material in which a line perpendicular to the side surface of the depression portion and extending toward an axial line of the base material passes inside the inner annular edge of the contacting part in a longitudinal cross-section of the base material, and the region in which the irregularity section is formed lies between the closest depression portions.

This makes it possible to form the irregularity section having uniform irregularities on the outer peripheral surface of the base material while preventing deformation (plastic deformation) of the base material reliably.

Further, in the developing agent carrier manufacturing method described above, it is also preferred that each of the end portions of the base material is formed into a thinner thickness part which is formed by enlarging the inner diameter of each end portion for receiving the corresponding flange, the thinner thickness part is defined by an inner step portion at a position opposite to the flange member, and the inner step portion being defined by a large diameter annular edge and a small diameter annular edge, wherein the irregularity section includes a number of depression portions in which a depression portion closest to each of the flange members has a side surface positioned on the side of the corresponding flange member, and wherein each of the closest depression portions is formed at a position on the outer peripheral surface of the base material in which a line perpendicular to the side surface of the depression portion and extending toward the axial line of the base material passes inside the large diameter annular edge of the inner step portion in a longitudinal cross section of the base material, and the region in which the irregularity section is formed lies between the closest depression portions.

This makes it possible to form the irregularity section having uniform irregularities on the outer peripheral surface of the base material while preventing deformation (plastic deformation) of the base material more reliably.

Further, in the developing agent carrier manufacturing method described above, it is also preferred that each of the closest depression portions is formed at a position on the outer peripheral surface of the base material in which a line perpendicular to the side surface of the depression portion and extending toward the axial line of the base material passes inside the small diameter annular edge of the inner step portion on the inner circumferential surface of the base material, and the region in which the irregularity section is to be formed lies between the closest depression portions.

This also makes it possible to form the irregularity section having uniform irregularities on the outer peripheral surface of the base material while preventing deformation (plastic deformation) of the base material more reliably.

Further, in the developing agent carrier manufacturing method described above, it is also preferred that each of the end portions of the base material is formed into a thinner thickness part which is formed by enlarging the inner diameter of the end portion for receiving the corresponding flange, wherein the thickness of the base material changes from each of the thinner thickness parts thereof toward other portion of the base material than the thinner thickness parts thereof gradually or in a stepwise manner.

Further, in the developing agent carrier manufacturing method described above, it is also preferred that each of the flange members having an inner end portion, and the cross sectional area of the inner end portion is gradually decreased in an insertion direction thereof.

With this structure, it As possible to suppress localized or sudden changes in the amount of deformation of the base material, when the outer peripheral surface of the base material is pressed with the dies. As a result, it is possible to form the irregularity section having uniform irregularities on the outer peripheral surface of the base material even in the case where the thinner thickness parts are formed on the base material, it is also possible to provide a developing roller having excellent properties by preventing deformation (plastic deformation) of the base material.

Further, in the developing agent carrier manufacturing method described above, it is also preferred that if the angle defined by the side surfaces of each of the first grooves and/or the second grooves is defined as "θ", the angle "θ" is in the range of 80 to 130°.

This makes it possible make to improve the tumbling capability of the developing agent so that the irregularity section can carry toner uniformly with the most appropriate amount of the toner Still other aspect of the present invention is directed to a developing agent carrier manufactured by the method mentioned above.

The developing agent carrier thus manufactured is excellent in developing characteristics and durability.

The above and other objects, features and advantages of the present invention will become apparent from the following description of preferred embodiments given in conjunction with the accompanying drawings.

DESCRIPTION OF THE EXEMPLARY EMBODIMENTS

Now, preferred embodiments of a developing agent carrier manufacturing method, a developing agent carrier, a developing device and an image forming apparatus in accordance with the present invention will be described with reference to the accompanying drawings.

Image Forming Apparatus

Brief description will be first given to an image forming apparatus of the present invention, i.e., an image forming apparatus provided with a developing device of the present invention.

Figure 1:
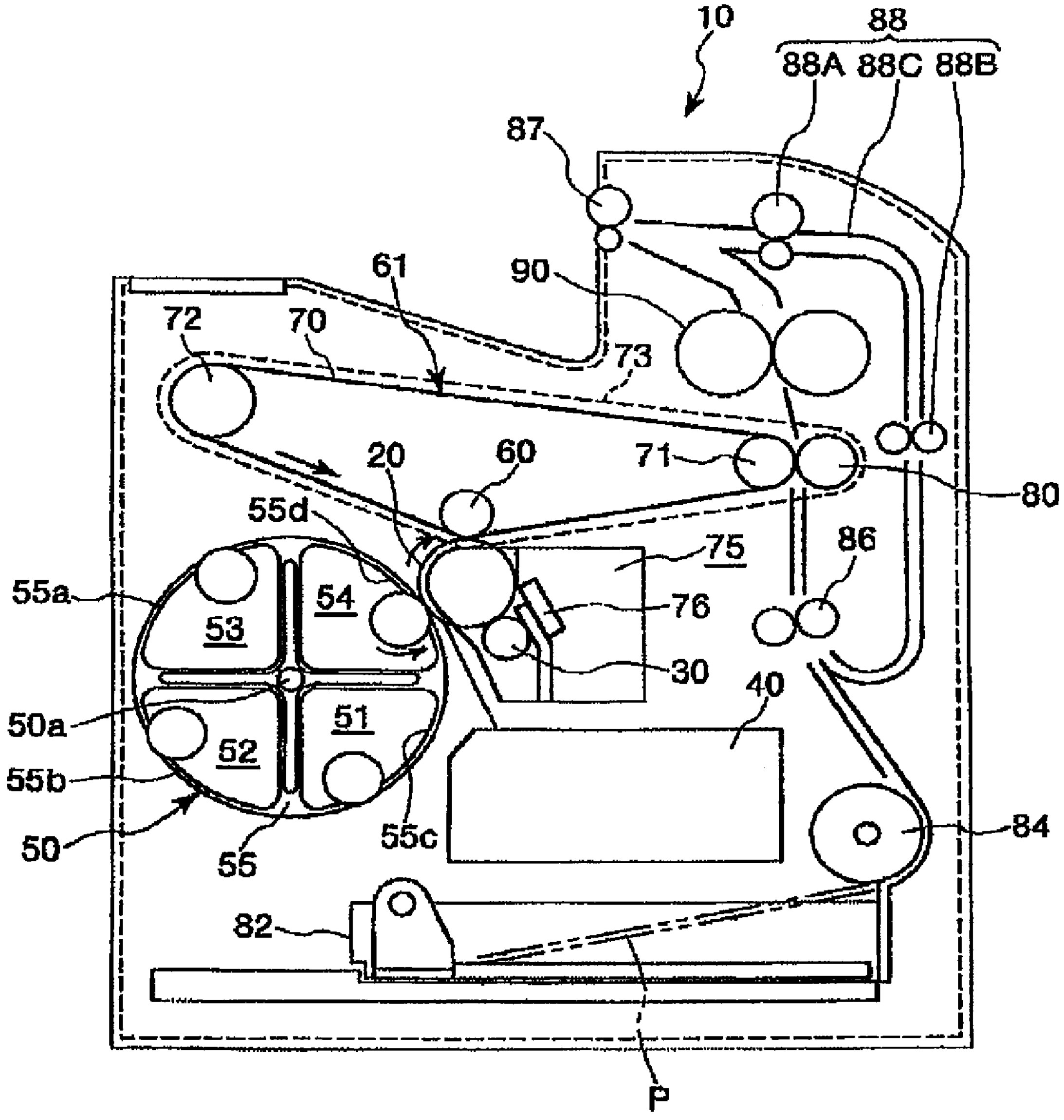
FIG. 1 is a schematic sectional view showing a simplified configuration of an image forming apparatus in accordance with the present invention.

FIG. 1 is a schematic sectional view showing an overall configuration of an image forming apparatus in accordance with the first to third embodiments of the present invention.

Referring to FIG. 1, the image forming apparatus 10 of this embodiment is an apparatus that records an image on a recording medium through a series of image forming processes mainly including an exposure step, a developing step, a transfer step and a fixing step. As shown in FIG. 1, the image forming apparatus 10 includes a photosensitive body 20 which carries, a latent image and rotates in the direction of the arrow shown in the drawings. The image forming apparatus 10 further includes an electrifying unit 30, an exposure unit 40, a developing unit 50, a primary transfer roller 60 and a cleaning unit 75, and they are arranged in the named order along the rotational direction of the photosensitive body 20. Further, in the lower portion in FIG. 1, the image forming apparatus 10 includes a paper supply tray 82 which holds a recording medium P such as paper or the like. Further, a secondary transfer roller 80 and a fixing unit 90 are arranged in the named order downstream from the paper supply tray 82 in the conveying direction of the recording medium P. Furthermore, in the case where an image is to be formed on both sides of a recording medium P, the image forming apparatus 10 is provided with a conveying section 88 for turning over a recording medium P, which has undergone a fixing process on one side by the fixing unit 90, and returning it to the secondary transfer railer 80.

The photosensitive body 20 includes a cylindrical conductive base material (not shown in the drawings) and a photosensitive layer (not shown in the drawings) formed on the outer peripheral surface thereof, and is rotatable about the axis thereof in the direction of the arrow shown in FIG. 1.

The electrifying unit 30 is a device for uniformly electrifying the surface of the photosensitive body 20 by corona charging or the like.

The exposure unit 40 is a device that forms an electrostatic latent image on the uniformly electrified photosensitive body 20 by irradiating a laser beam in accordance with image information received from a host computer such as a personal computer or the like not shown in the drawings.

The developing unit 50 includes four developing devices, namely, a black developing device 51, a magenta developing device 52, a cyan developing device 53 and a yellow developing device 54. These developing devices 51, 52, 53 and 54 are devices which make the latent image visible as a toner image (developing agent image) and are selectively used in accordance with the latent image formed on the photosensitive body 20. The black developing device 51 uses black (K) toner as a developing agent, the magenta developing device 52 uses magenta (M) toner, the cyan developing device 53 uses cyan (C) toner, and the yellow developing device 54 uses yellow (Y) toner to carry out a developing operation.

The YMCK developing unit 50 in the present embodiment is rotatable to ensure that the four developing devices 51, 52, 53 and 54 face the photosensitive body 20. Namely, in the YMCK developing unit 50, the four developing devices 51, 52, 53 and 54 are held respectively in four holding portions 55*a*, 55*b*, 55*c* and 55*d* of a holding body 55 which is rotatable around a shaft 50*a*. By rotating the holding body 55, the four developing devices 51, 52, 53 and 54 are selectively allowed to face the photosensitive body 20, while maintaining a relative relationship in position. Each of the developing devices 51, 52, 53 and 54 is provided with a developing agent carrier manufactured by a developing agent carrier manufacturing method of the present invention described below. The developing devices 51, 52, 53 and 54 will be described later in detail.

An intermediate transfer body 61 includes an endless belt type intermediate transfer belt 70 which is wound around the primary transfer roller 60, a driven roller 72 and a drive roller 71. The intermediate transfer belt 70 is driven rotationally at roughly the same circumferential speed as that of the photosensitive body 20 in the direction of the arrow shown in FIG. 1.

The primary transfer roller 60 is a device for transferring a monochrome toner image formed on the photosensitive body 20 to the intermediate transfer belt 70.

A toner image having at least one color of black, magenta cyan and yellow is carried an the intermediate transfer belt 70. For example, when forming a full color image, transferring is carried out by sequentially layering toner images having the four colors including black, magenta, cyan and yellow to form a full color toner image. In this embodiment, the drive roller 71 functions as a backup roller of the secondary transfer roller 80 described later. The primary transfer roller 60, the drive roller 71 and the driven roller 72 are supported by a base 73.

The secondary transfer roller 80 is a device for transferring monochrome or full color toner images or the like formed on the intermediate transfer belt 70 to a recording medium P such as paper, film, cloth or the like.

The fixing unit 90 is a device for fusion-fixing the toner image to the recording medium P to form a permanent image by applying heat and pressure to the recording medium P on which the toner image has been transferred.

The cleaning unit 75 includes a rubber-made cleaning blade 76 which makes contact with the surface of the photosensitive body 20 between the primary transfer roller 60 and the electrifying unit 30. The cleaning unit 75 is provided for scrapping off any toner that remains on the photosensitive body 20 by the cleaning blade 76 after the toner image has been transferred onto the intermediate transfer belt 70 by the primary transfer roller 60.

The conveying section 88 is equipped with a pair of conveying rollers 88A, 88B through which is conveyed a recording medium P that has undergone a fixing process on one side by the fixing unit 90, and a conveying route 88C which turns over the recording medium P conveyed by the pair of conveying rollers 88A, 88B and guides it toward registration rollers 86. In this way, in the case where an image is to be formed on both sides of a recording medium P, the recording medium P that has undergone a fixing process on one side by the fixing unit 90 is turned over and returned to the secondary transfer roller 80.

Next, the operation of the image forming apparatus 10 having the above structure will be described.

First, the photosensitive body 20, the developing rollers (not shown in the drawings) provided in the developing unit 50, and the intermediate transfer belt 70 are started to rotate in accordance with instructions from a host computer not shown in the drawings. Then, the photosensitive body 20 is sequentially charged by the electrifying unit 30 while rotating.

The charged area of the photosensitive body 20 reaches the exposure position according to the rotation of the photosensitive body 20, and a latent image according to first color (e.g., yellow) image information is formed in the charged area by the exposure unit 40.

The latent image formed on the photosensitive body 20 reaches the developing position according to tho rotation of the photosensitive body 20, and developing with yellow toner is carried out by the yellow developing device 54. In this way, a yellow toner image is formed on the photosensitive body 20. At this time, the yellow developing device 54 of the YMCK developing unit 50 faces the photosensitive body 20 at such a developing position.

The yellow toner image formed on the photosensitive body 20 reaches a primary transfer position (namely, a position in which the photosensitive body 20 faces the primary transfer roller 60) according to the rotation of the photosensitive body 20, and is transferred (primarily transferred) to the intermediate transfer belt 70 by the primary transfer roller 60. At this time, a primary transfer voltage (primary transfer bias) having the opposite polarity as the charge polarity of the toner is applied to the primary transfer roller 60. Further, during this time, the secondary transfer roller 80 is kept separated from the intermediate transfer belt 70.

By repeating the same process described above for the second color, the third color and the fourth color, each color toner image corresponding to each image signal is transferred and layered onto the intermediate transfer belt 70. In this way, a full color toner image is formed on the intermediate transfer belt 70.

On the other hand, the recording medium P is conveyed from the paper supply tray 82 to the secondary transfer roller 80 by a paper supply roller 84 and the registration rollers 86.

The full color toner image formed on the intermediate transfer belt 70 reaches a secondary transfer position (namely, a position in which the secondary transfer roller 80 faces the drive roller 71) according to the rotation of the intermediate transfer belt 70, and is transferred (secondarily transferred) to the recording medium P by the secondary transfer roller 80. At this time, the secondary transfer roller 80 is pressed against the intermediate transfer belt 70 and a secondary transfer voltage (secondary transfer bias) is applied to the intermediate transfer belt 70.

The full color toner image transferred to the recording medium P is fused to the recording medium P under the heat and pressure applied by the fixing unit 90. Then, the recording medium P is ejected to the outside of the image forming apparatus 10 by a pair of paper ejection rollers 87.

On the other hand, after the photosensitive body 20 passes the primary transfer position, the toner adhering to the surface thereof is scraped off by the cleaning blade 76 of the cleaning unit 75, and then preparation is made for the electrification for forming the next latent image. The scraped off toner is collected in a residue toner collecting portion inside the cleaning unit 75.

In the case where an image is to be formed on both sides of a recording medium P, the pair of paper ejection rollers 87 is driven in reverse and the pair of conveying rollers 88A, 88B is driven after the recording medium P which has undergone a fixing process on one side by the fixing unit 90 is held between the pair of paper ejection rollers 87, whereby the recording medium P is turned over as it passes through the conveying section 88 and returned to the secondary transfer roller 80. Then, by carrying out the same operation described above, an image is formed on the other side of the recording medium P.

Developing Device

Next, the developing devices 51, 52, 53 and 54 of the developing unit 50 will be described in detail. Although the developing devices 51, 52, 53 and 54 mace use of different kinds of toner, they have the same configuration in other respects than the toner kind. Therefore, the yellow developing device 54 alone will be representatively described herein below with reference to FIG. 2.

Figure 2:
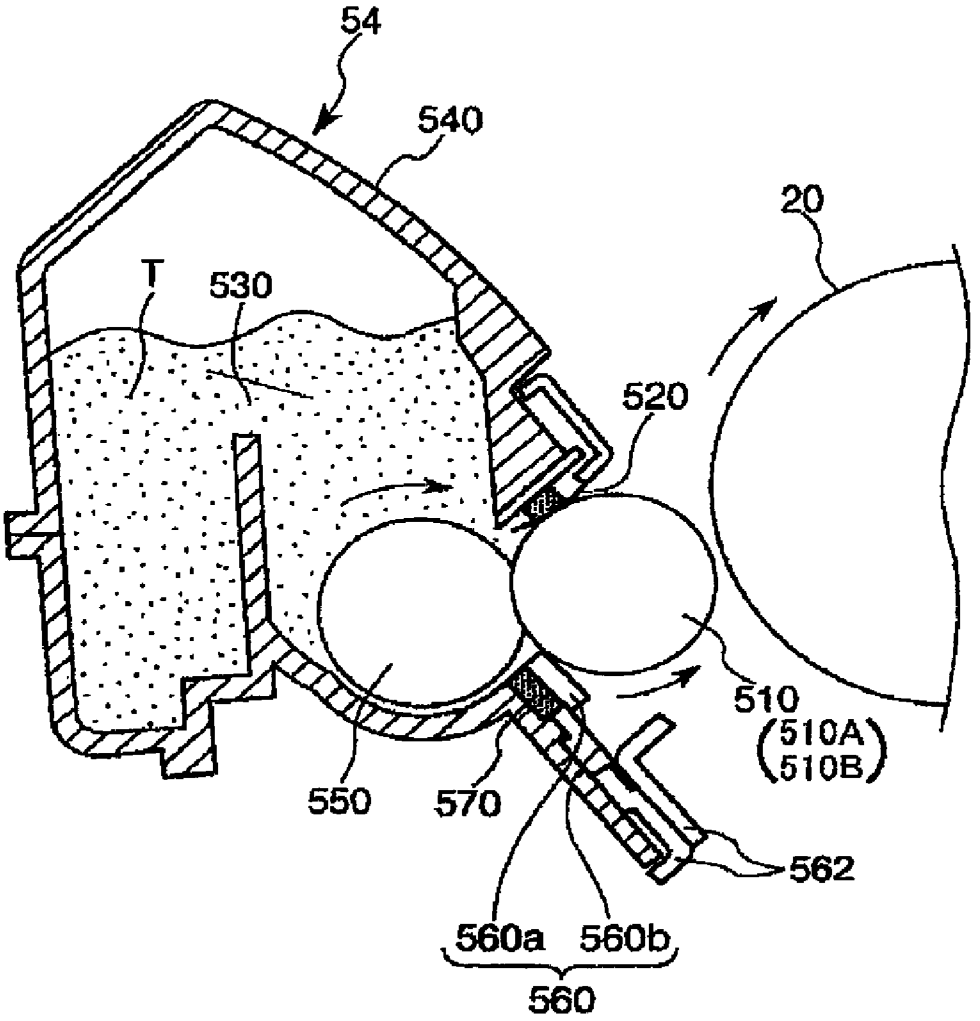
FIG. 2 is a schematic sectional view illustrating a simplified configuration of a developing device in accordance with the present invention.

FIG. 2 is a schematic sectional view illustrating a simplified configuration of a developing device in accordance with the present invention.

The yellow developing device 54 shown in FIG. 2 includes a housing 540 for receiving toner T (yellow toner) as a developing agent, a developing roller 510 serving as a developing agent carrier, a toner supply roller 550 for supplying the toner T to the developing roller 510 and a restriction blade 560 for restricting the layer thickness of the toner T carried on the developing roller 510.

The housing 540 is adapted to receive the toner T in a receiving portion 530 formed of an internal space thereof. The toner supply roller 550 and the developing roller 510 are supported on the housing 540 at and around an opening formed in a lower portion of the receiving portion 530 in such a manner that they can rotate in a mutually pressure-contacted condition. The restriction blade 560 is attached to the housing 540 and pressure-contacted with the developing roller 510. Also attached to the housing 540 is a seal member 520 for preventing the toner from being leaked from between the housing 540 and the developing roller 510 at the opening.

The developing roller 510 is adapted to carry the toner T on its outer peripheral surface and convey the toner T to a developing position in which the developing roller 510 faces the photosensitive body 20 (hereinafter, simply referred to as "developing position"). The developing roller 510 is of a hollow cylindrical shape and is rotatable about an axis thereof. In this embodiment, the developing roller 510 is rotated in the opposite direction to the rotational direction of the photosensitive body 20. The developing roller 510 will be further described in detail later.

In this embodiment, when a developing operation is carried out by the yellow developing device 54, the developing roller 510 and the photosensitive body 20 are confronted with each other in a non-contact condition with a minute gap left therebetween. By applying an alternating electric field to between the developing roller 510 and the photosensitive body 20, the toner T is caused to fly from the developing roller 510 onto the photosensitive body 20, thereby developing the latent image on the photosensitive body 20.

The toner supply roller 550 supplies the toner T received within the receiving portion 530 to the developing roller 510. The toner supply roller 550 is made of polyurethane foam or the like and is pressure-contacted with the developing roller 510 in an elastically deformed condition. In this embodiment, the toner supply roller 550 is rotated in the opposite direction to the rotational direction of the developing roller 510. The toner supply roller 550 performs not only the function of supplying the toner T received within the receiving portion 530 to the developing roller 510 but also the function of scrapping off the toner T remaining on the developing roller 510 at the end of the developing operation.

The restriction blade 560 restricts the layer thickness of the toner T carried on the developing roller 510 and, at the time of performing the restriction operation, applies electric charges to the toner T carried on the developing roller 510 by frictional electrification. The restriction blade 560 also serves as a seal member at an upstream side of the developing position in the rotational direction of the developing roller 510.

The restriction blade 560 includes a rubber portion 560*a* serving as a contact member that makes contact with the developing roller 510 along the axial direction thereof and a rubber support portion 560*b* serving as a support member that supports the rubber portion 560*a*. The rubber portion 560*a* is chiefly made of silicon rubber, urethane rubber or the like. In view of the fact that the rubber support portion 560*b* functions to push the rubber portion 560*a* toward the developing roller 510, the rubber support portion 560*b* is formed of a sheet-like thin plate having a spring property (resiliency), such as phosphor bronze, stainless steel or the like. The rubber support portion 560*b* is fixedly secured at its one end to a blade support metal plate 562. The blade support metal plate 562 and the seal member 520 are attached to the housing 540. Under the state that the developing roller 510 is mounted in place, the rubber portion 560*a* is pressed against the developing roller 510 under the resilient force exerted by the rubber support portion 560*b*.

In this embodiment, a blade backing member 570 is provided on the opposite side of the restriction blade 560 from the developing roller 510. The blade backing member 570 prevents the toner T from being infiltrated into between the rubber support portion 560*b* and the housing 540 and presses the rubber portion 560*a* against the developing roller 510.

In this embodiment, the free end of the restriction blade 560, i.e., the end of the restriction blade 560 opposite to the side supported on the blade support metal plate 562, makes contact with the developing roller 510 not at its distal edge but at the region a little spaced apart from the distal edge. Furthermore, the restriction blade 560 is arranged such that the tip end thereof can face the upstream side in the rotational direction of the developing roller 510, thereby making what is called "counter-contact" with the developing roller 510.

Developing Agent Carrier

Now, the developing roller 510 which is one example of the developing agent carrier of the present invention will be described in detail with reference to FIGS. 3 and 4.

Figure 3:
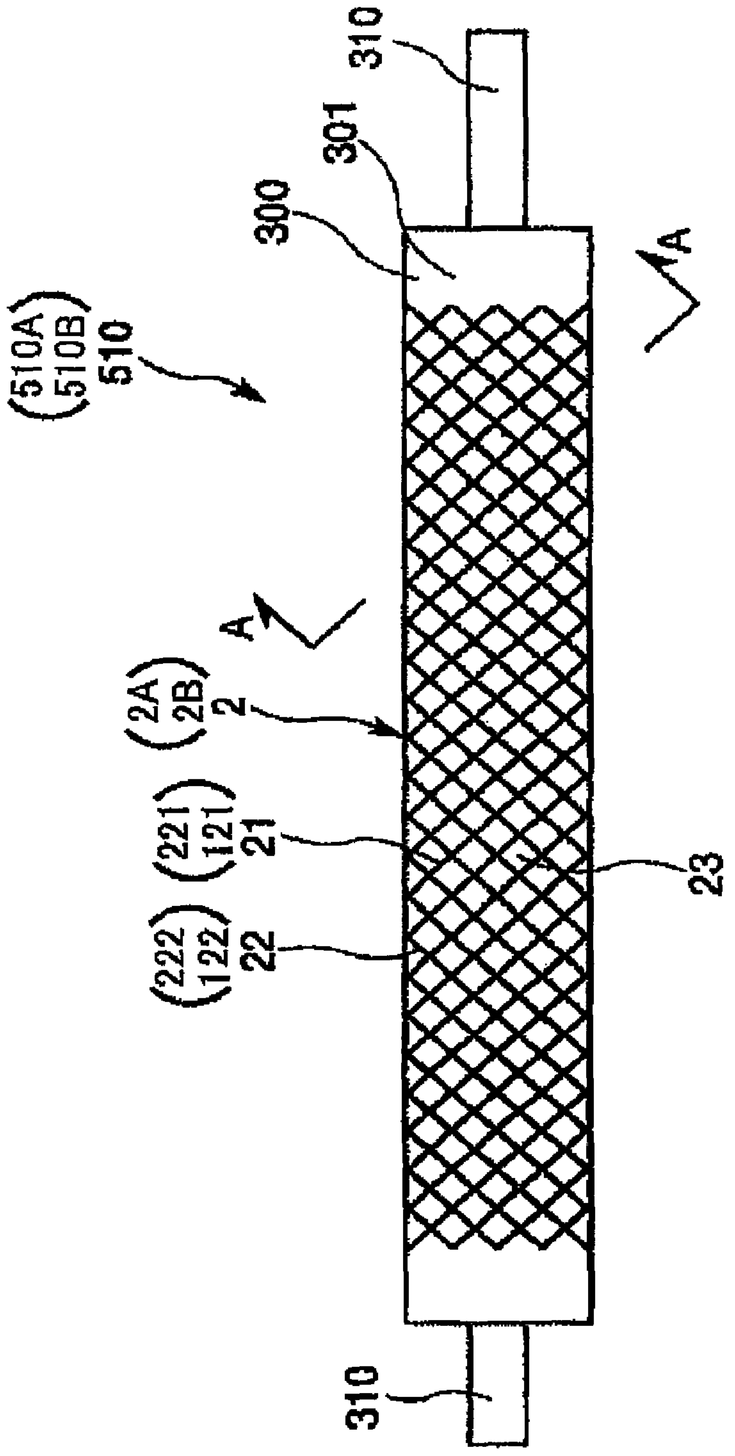
FIG. 3 is a top view depicting a simplified configuration of a developing agent carrier (developing roller) for the first embodiment (second or third embodiment) employed in the developing agent carrier illustrated in FIG. 2.

FIG. 3 is a top view depicting a simplified configuration of a developing agent carrier employed in the developing agent carrier illustrated in FIG. 2. FIG. 4 is an enlarged sectional view taken along line A-A in FIG. 3.

The developing roller 510 shown in FIG. 3 includes a hollow cylindrical main body 300 and shaft portions 310 protruding from the opposite ends of the main body 300 and serving as rotation axes.

As illustrated in FIG. 3, an irregularity section 2 for carrying the toner is formed on an outer peripheral surface 301 of the main body 300. The irregularity section 2 is comprised of a plurality of first grooves 21 extending in a generally parallel relationship with one another and a plurality of second grooves 22 extending in a generally parallel relationship with one another but intersecting the first grooves 21 (substantially orthogonally intersecting the first grooves 21 in this embodiment). Namely, the plurality of first grooves 21 and the plurality of second grooves 22 are formed on the outer peripheral surface 301 in a lattice pattern. Therefore, a protrusion portion 23 is formed in the region enclosed by a pair of mutually adjoining first grooves 21 and a pair of mutually adjoining second grooves 22.

As can be seen in FIG. 3, the first grooves 21 are formed along the outer peripheral surface 301 in a spiral manner. In other words, the first grooves 21 extend in a direction inclined with respect to the circumferential direction of the outer peripheral surface 301.

Figure 4:
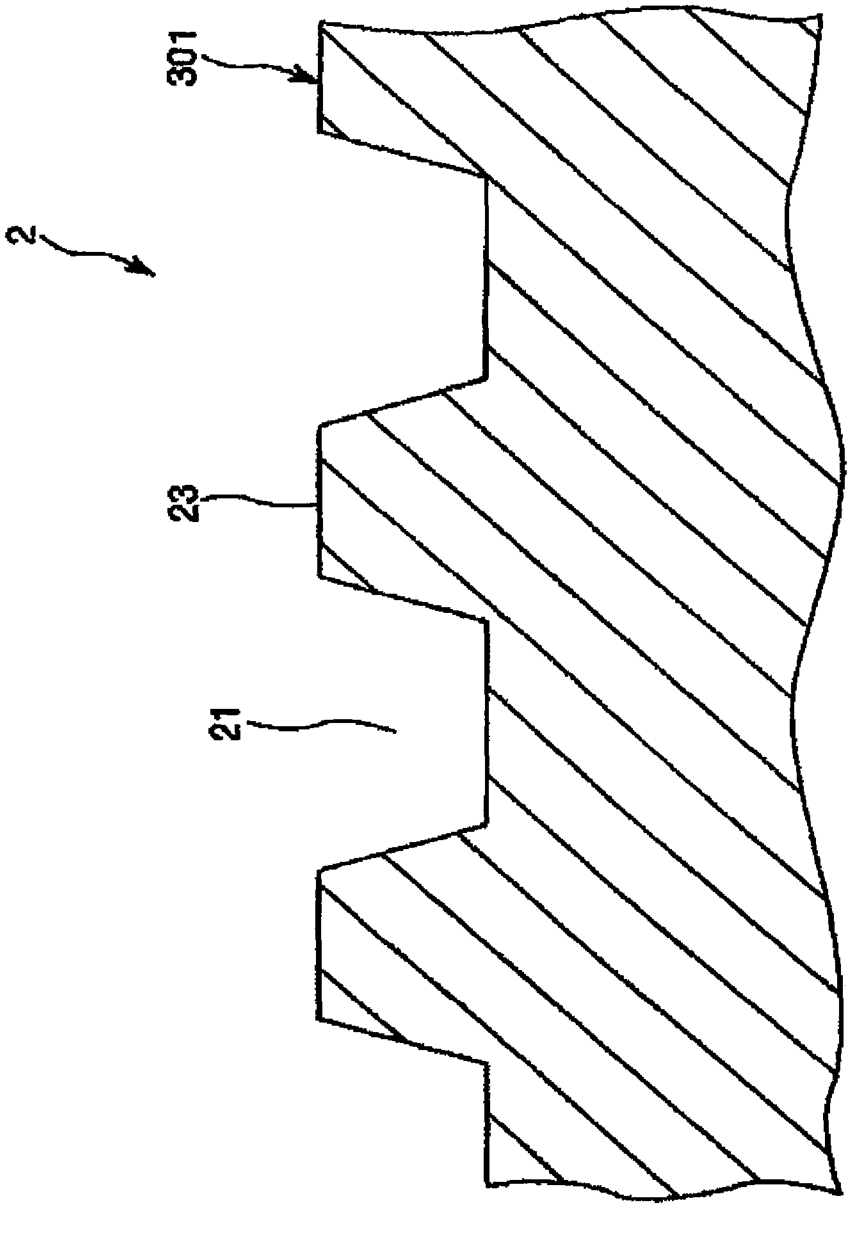
FIG. 4 is an enlarged sectional view of a part of the developing agent carrier for the first embodiment taken along line A-A in FIG. 3.

Referring to FIG. 4, each of the first grooves 21 is formed to have a cross-section of a trapezoidal shape. The second grooves 22 have the same configuration as that of the first grooves 21, except that they extend in the different direction than the first grooves 21 as set forth above. In FIG. 4, the first grooves 21 and the second grooves 22 are schematically shown for the sake of convenience in description.

Since the irregularity section 2 is formed regularly and uniformly, a uniform and optimal quantity of toner T can be carried on the developing roller 510 and the tumbling capability (ease of tumbling movement) of the toner T on the outer peripheral surface of the developing roller 510 can be made uniform. As a result, it is possible to avoid local poor electrification or local poor conveyance of the toner, thereby allowing the developing roller 510 to exhibit enhanced developing characteristics.

Unlike the irregularities obtained by blast treatment, the irregularity section 2 exhibits excellent mechanical strength because the protrusion portions 23 of the irregularity section 2 have tip ends of a relatively large width. In particular, since the irregularity section 2 is obtained by treatment such as die transfer (die rolling) or the like, the pressed region has enhanced mechanical strength and the resultant irregularity section 2 shows greater mechanical strength than the one obtained by other treatment such as cutting work or the like. The developing roller 510 having such an irregularity section 2 can enjoy increased durability even when it makes sliding contact with the restriction blade 560, the toner supply roller 550 and so forth. Thus, the developing roller 510 can be desirably employed in the developing device that makes use of dry monocomponent nonmagnetic toner. In addition, if the protrusion portions of the irregularity section 2 have tip ends of a relatively large width as noted above, they undergo little change in shape even when worn out. This helps to prevent rapid degradation of developing characteristics and makes it possible for the developing roller to enjoy excellent developing characteristics for a prolonged period of time.

The main body 300 of such a developing roller 510 is chiefly made of a metallic material such as aluminum, stainless steel, iron or the like.

If needed, the outer peripheral surface (surface 301) of the main body 300 may be plated with nickel, chromium or the like.

The outer diameter of the main body 300 is not particularly restricted but may preferably be in the range of, e.g., 10 to 30 mm and more preferably in the range of 15 to 20 mm.

Developing Agent Carrier Manufacturing Method

Next, a method for manufacturing the developing roller 510 will be described with reference to FIGS. 5 through 8, as one example of the developing agent carrier manufacturing method in accordance with the present invention.

Figure 6:
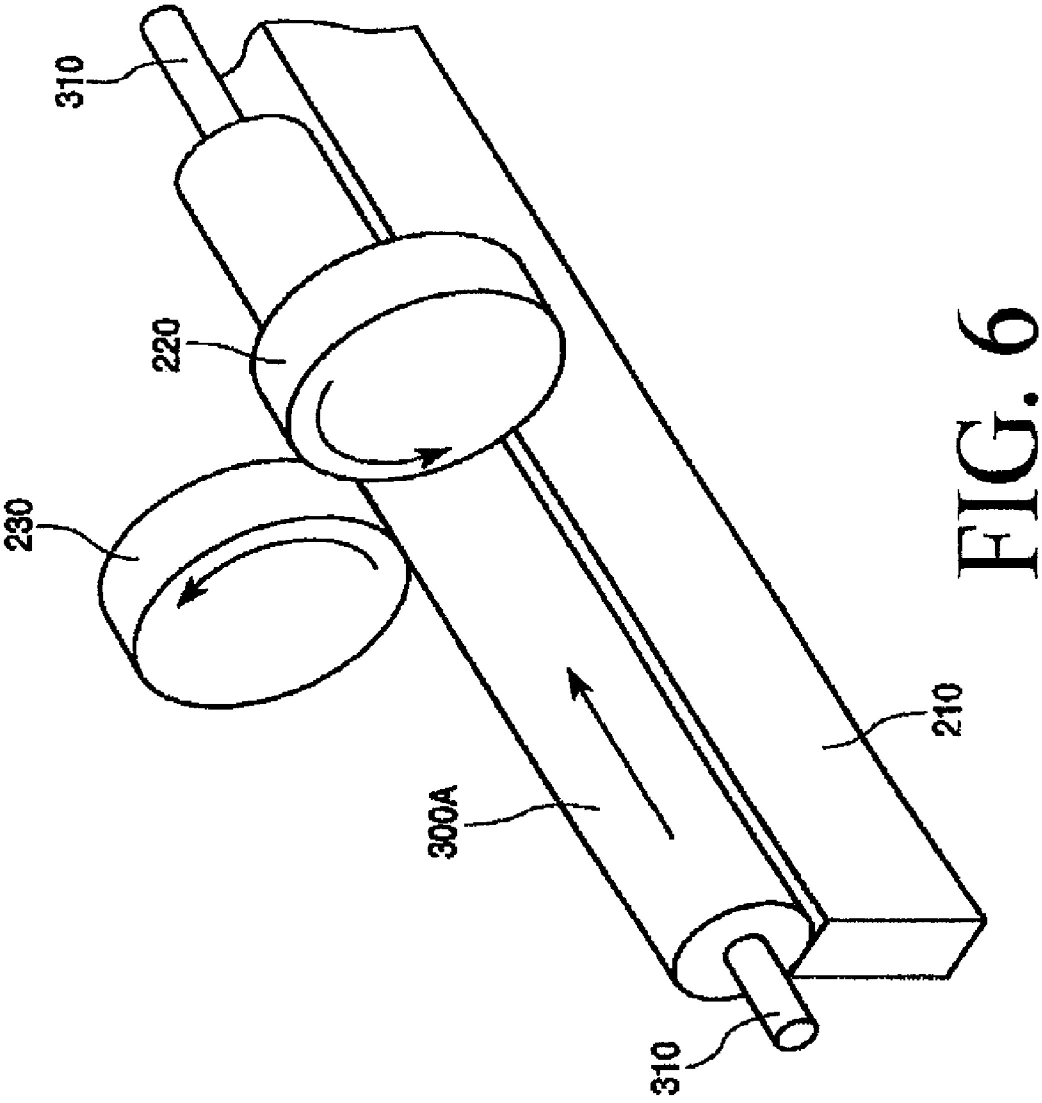
FIG. 6 is a perspective view showing a simplified configuration of a device for forming an irregularity section on an outer peripheral surface of a base material in the method illustrated in FIG. 5.
Figure 7:
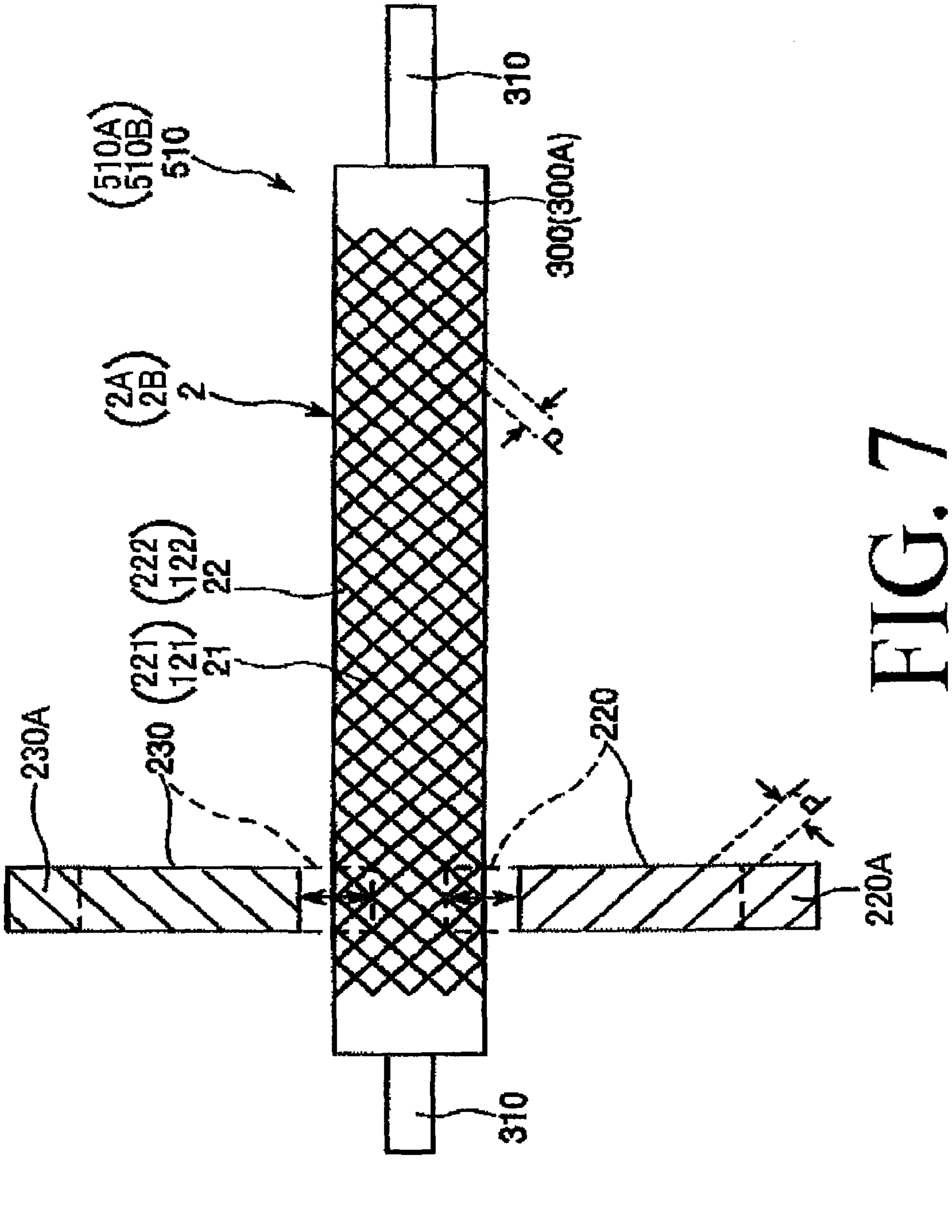
FIG. 7 is a top view of the device shown in FIG. 6.

FIG. 5 is a view for explaining a developing agent carrier manufacturing method in accordance with one embodiment of the present invention. FIG. 6 is a perspective view showing a simplified configuration of a device for forming an irregularity section on an outer peripheral surface of a base material in the method illustrated in FIG. 5. FIG. 7 is a top view of the device shown in FIG. 6. FIG. 8 is a view for explaining a process for forming an irregularity section on an outer peripheral surface of a base material in the method illustrated in FIG. 5.

The method for manufacturing the developing roller 510 includes a step [1] of preparing a hollow cylindrical base material which is to become the developing roller 510 and a step [2] of forming the irregularity section 2 on the outer peripheral surface of the base material. In the following, the respective steps will be described in order.

[1] Base Material Preparing Step

Figure 5A:
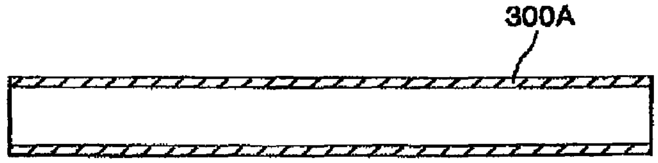
FIG. 5 is a view for explaining a developing agent carrier manufacturing method in accordance with the first to third embodiments of the present invention.

As illustrated in FIG. 5A, a hollow cylindrical base material 300A which is to become the developing roller 510 is prepared first.

The base material 300A is to become the main body 300 of the developing roller 510 and is chiefly made of a metallic material such as aluminum, stainless steel, iron or the like. More specifically, an iron-based material such as STKM, STK, SGP or the like or an aluminum-based material such as A6063, A5056 or the like is preferably used as the constituent material of the base material 300A. This makes it possible to easily and reliably form the irregularity section 2 on the outer peripheral surface 301 of the main body 300 (developing roller 510) in the subsequent manufacturing step set forth below.

The outer diameter of the base material 300A is not particularly restricted but may preferably be in the range of 10 to 30 mm and more preferably in the range of 15 to 20 mm.

Furthermore, the thickness of the base material 300A is not particularly restricted but may preferably be in the range of 0.2 to 3 mm and more preferably in the range of 0.5 to 3 mm.

Figure 5B:
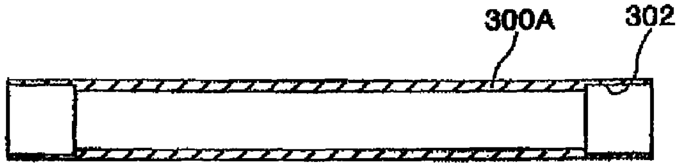

Referring to FIG. 5B, the inner peripheral sections at the axial opposite end portions of the base material 300A are removed and made thin by a thickness of, e.g., about 0.5 to 1 mm, through cutting work or the like, thus forming pressure-insertion openings 302 in the both ends of the base material 300A into which flange members 310A serving as rotation axes are forcedly inserted, respectively.

This increases the precision degree of dimensions of the pressure-insertion openings 302 and makes it possible for the flange members 310A to be forcedly fitted to the openings of the both ends of the base material 300A, respectively. After the insertion process, the flange members 310A are firmly fixed to the base material 300A with no need to use an adhesive agent or welding.

Figure 5C:
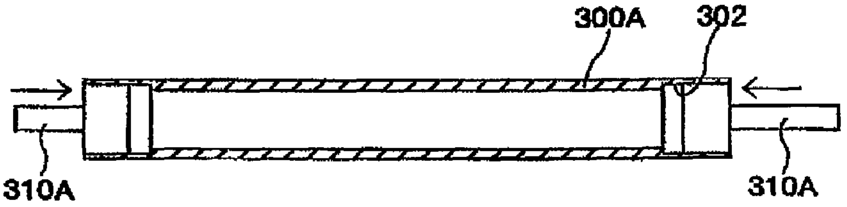

Then, the flange members 310A are forcedly inserted into the openings 302 of the both ends of the base material 300A as shown in FIG. 5C, respectively. This ensures that the flange members 310A are fixedly secured to the base material 300A.

The flange members 310A may be secured to the base material 300A either merely by inserting the flange members 310A into the pressure-insertion openings 302 of the base material 300A or by using an adhesive agent or welding.

Figure 5D:
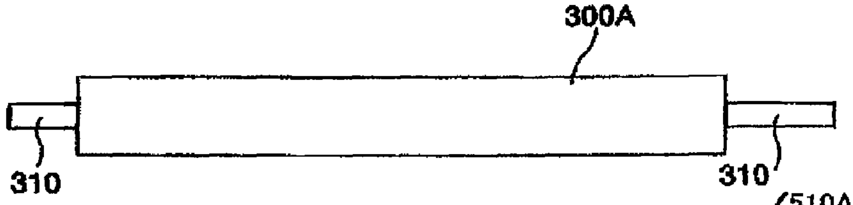

Subsequently, the outer peripheral surface of the base material 300A and the outer peripheral surfaces of the extension portions (shaft portions) of the flange members 310A projecting from the opposite end surfaces of the base material 300A are subjected to a grinding process in order to ensure that the axis of the base material 300A coincides with the axis of the extension portions of the flange members 310A. This provides rotation shafts 310 projecting from the opposite ends of the base material 300A as shown in FIG. 5D.

Although no particular restriction is imposed on the grinding process, it is preferable to use a centerless grinding method, for instance.

In the base material 300A and the rotation shafts 310 thus ground, the tolerance in outer diameter is preferably in the range of ±10 to ±50 μm, the deflection is preferably in the range of 10 to 50 μm, and the surface roughness is preferably in the range of 0.5 to 1 μm. This makes it possible to increase the precision degree of dimensions of the developing roller 510 obtained.

The processes of forming the pressure-insertion portions 302 and forcedly inserting the shaft members 310A may be performed subsequent to the step [2] described below. Moreover, it may be possible to omit the processes of forming the pressure-insertion openings 302 and grinding the outer peripheral surfaces of the base material 300A and the flange 310.

[2] Irregularity Section Forming Step

Figure 5E:
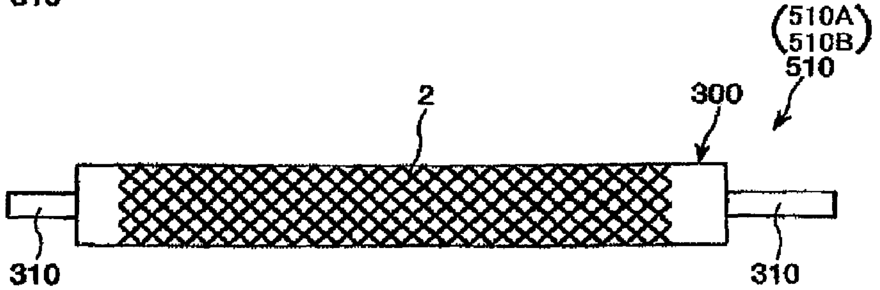

Next, the irregularity section 2 is formed on the outer peripheral surface of the base material 300A as illustrated in FIG. 5E.

In the following, the process for forming the irregularity section 2 will be described in detail with reference to FIGS. 6 through 8.

In the process of forming the irregularity section 2, a machining device 200 shown in FIGS. 6 and 7 is used by way of example.

Referring to FIGS. 6 and 7, the machining device 200 includes a base 210 for supporting the bottom side of the base material 300A obtained in the step [1] described above, and a first die 220 and a second die 230 (a pair of dice) for pressing the opposite lateral sides of the base material 300A supported on the base 210.

The first die 220 and the second die 230 are respectively of a disk shape (short solid cylindrical shape) and are rotatable about the axis thereof.

As illustrated in FIG. 7, the first die 220 is provided with a plurality of ridges (projection portions) 220A corresponding in shape to the plurality of first grooves 21 which are to be formed. Similarly, the second die 230 is provided with a plurality of ridges (projection portions) 230A corresponding in shape to the plurality of second grooves 22 which are to be formed.

The constituent material of the first die 220 and the second die 230 is not particularly restricted but may preferably be a material having a greater hardness than the base material 300A. To be more specific, SKD, SKH, SLD or the like can be desirably used for that purpose.

The pitch between the ridges 220A and the pitch between the ridges 230A ("P1" in FIG. 7) are not particularly restricted but may preferably be in the range of 50 to 150 μm and more preferably in the range of 50 to 100 μm.

As already described above, the irregularity section 2 is comprised of the plurality of first grooves 21 extending in a generally parallel relationship with one another and the plurality of second grooves 22 extending in a generally parallel relationship with one another but intersecting the first grooves 21. Accordingly, the irregularity section 2 can be readily formed in a regular and uniform pattern by using the aforementioned dice of a relatively simple shape.

The first grooves 21 and the second grooves 22 are formed by use of different dice. The respective dice can be produced merely by forming a plurality of mutually parallel ridges, which makes it possible to simplify the shape of the dice and to reduce the costs incurred in connection with the dice.

The pitch "P1" between the ridges 220A of the first die 220 is two times greater than the pitch "P" between the first grooves 21. Likewise, the pitch between the ridges 230A of the second die 230 is two times greater than the pitch between the second grooves 22.

If the pitch between the first grooves 21 and the pitch between the second grooves 22 are defined as "P", the P is preferably smaller than the pitch of a resolving power employed (a resolving power of an image). More specifically, the P is preferably smaller than 169 μm in case of the resolving power being 150 dpi, smaller than 127 μm in case of the resolving power being 200 dpi, and smaller than 85 μm in case of the resolving power being 300 dpi. This makes it possible to prevent a toner image obtained by development from becoming uneven.

If the depth of the first grooves 21 and the second grooves 22 is defined as "D" and if the average particle size of the toner T (developing agent) is defined as "d", D/d is preferably equal to 0.5 to 2 and more preferably 0.9 to 1.3. This makes it possible for the developing roller 510 to carry the toner T on the irregularity section 2 in a uniform and optimal quantity. In case where the D/d is smaller than the lower limit value, the toner is hard to be caught by the protrusion portions of the irregularity section 2 depending on the shape of the irregularity section 2 or other conditions, thereby degrading the tumbling capability of the toner and causing poor electrification to occur. On the other hand, if the D/d is greater than the upper limit value, it is often the case that the toner in the grooves 21 and 22 (depression portions of the irregularity section 2) fails to make contact with any one of the developing roller 510 and the restriction blade 560 depending on the shape of the irregularity section 2 or other conditions, thus leading to poor electrification.

If the width of the first grooves 21 and the second grooves 22 is defined as "W" and if the average particle size of the developing agent is defined as "d", W/d is preferably equal to 2 to 20 and more preferably 4 to 10. This makes it possible for the developing roller 510 to carry the toner T (developing agent) on the irregularity section 2 in a uniform and optimal quantity. In case where the W/d is smaller than the lower limit value, the toner fails to move into the grooves depending on the shape of the irregularity section 2 or other conditions, which leads to degraded tumbling capability and poor electrification of the toner. Even when the toner is moved into the grooves, it continues to stay in the grooves and tends to create a filming phenomenon on the other hand, if the W/d is greater than the upper limit value, it is often the case that, depending on the shape of the irregularity section 2 or other conditions, the quantity of the toner carried on the developing roller 510 is decreased to such an extent as to bring about poor conveyance of the toner, and the chance for the toner to make contact with the protrusion portions of the irregularity section 2 is reduced, thereby resulting in degraded tumbling capability and poor electrification.

The first die 220 and the second die 230 noted above are arranged in such a fashion that the planes thereof are slightly inclined with respect to the direction perpendicular to the axis of the base material 300A.

As the first die 220 and the second die 230 are caused to rotate in the mutually opposite directions while pressing the opposite lateral sides of the base material 300A, the base material 300A is conveyed in its axial direction, as indicated by an arrow in FIG. 6, and is machined by means of the first die 220 and the second die 230.

During the process of forming the first grooves 21 of the irregularity section 2 by such a machining operation, the first grooves 21 are formed by pressing twice the ridges 220A of the first die 220 against the outer peripheral surface of the base material 300A, at which time the first pressing position and the second pressing position are dislocated in a pitchwise direction.

Similarly, in the process of forming the second grooves 22 of the irregularity section 2, the second grooves 22 are formed by pressing twice the ridges 230A of the second die 230 against the outer peripheral surface of the base material 300A, at which time the first pressing position and the second pressing position are dislocated in a pitchwise direction.

By forming the irregularity section 2 in this way, it becomes possible to form the irregularity section 2 having extremely fine irregularities on the outer peripheral surface of the developing roller 510. The fine irregularities thus formed can have sizes smaller than those that can be obtained by the use of a single die.

This makes it possible to form the irregularity section 2 having extremely fine irregularities having sizes substantially equal to or smaller than those obtained by blast treatment. As a result, the thus obtained developing roller 510 can have improved tumbling capability (ease of tumbling movement) of toner particles on the outer peripheral surface of the developing roller. Further, such a developing roller 510 can carry toner of an extremely uniform amount and achieve extremely excellent electrification and conveyance of the toner.

In the following, the method for forming the irregularity section 2 according to the first embodiment will be described in more detail. Seeing that the first grooves 21 and the second grooves 22 are formed substantially in the same manner, only the method of forming the first grooves 21 will be described representatively. The description given below is directed to the case where the irregularity section 2 is formed by performing the pressing operation twice. The number of pressing operation may be three or more.

The step of forming the irregularity section 2 includes a first step of forming a plurality of first depression portions on the outer peripheral surface of the base material 300A by use of a die and a second step of forming a plurality of second depression portions on the outer peripheral surface of the base material 300A by use of a die identical with or differing from the die used in forming the first depression portions, in such a manner that the second depression portions are formed between the first depression portions.

Figure 8A:
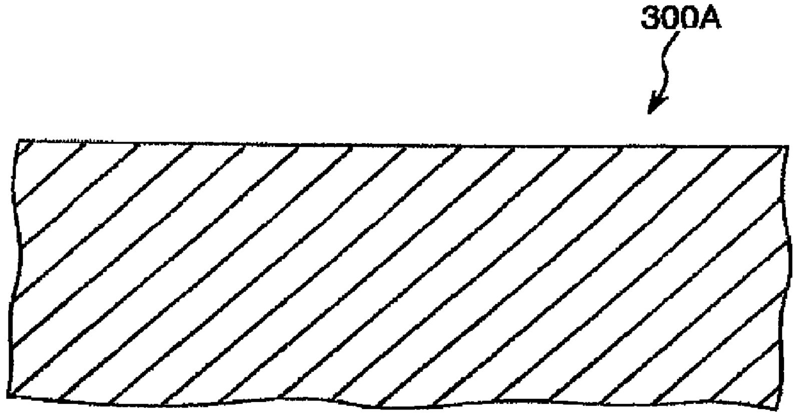
FIG. 8 is a view for explaining a process for forming an irregularity section on an outer peripheral surface of a base material in the method illustrated in FIG. 5 according to the first embodiment.
Figure 8B:
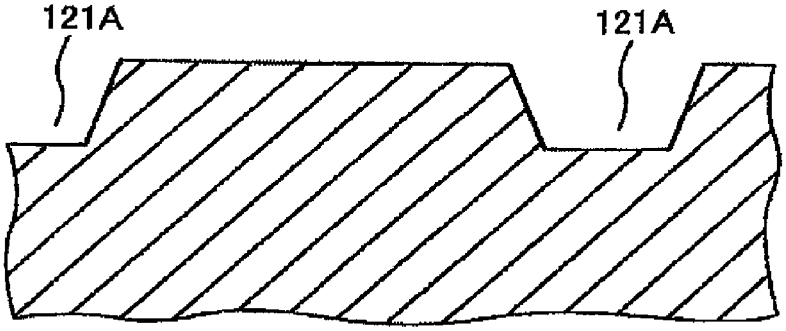
Figure 8C:
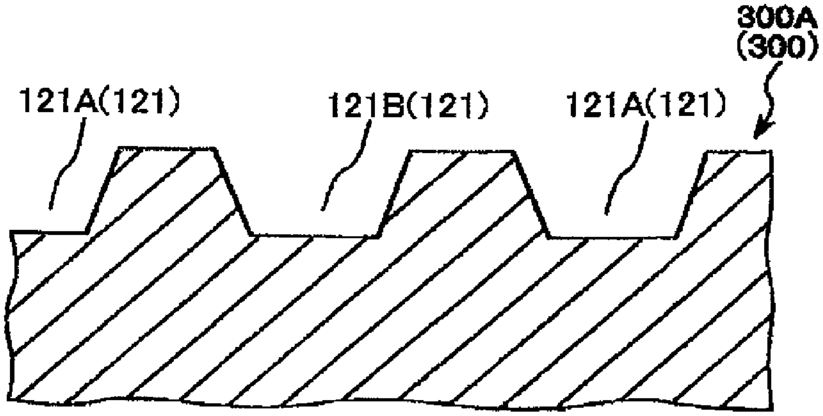

More specifically, in the first pressing operation (the first step), the ridges 220A of the first die 220 are pressed against the outer peripheral surface of the base material 300A shown in FIG. 8A to thereby form a plurality of grooves (first depression portions) 21A with the pitch two times greater than the pitch between the first grooves 21 to be formed, as illustrated in FIG. 8B.

Subsequently, in the second pressing operation (the second step), the ridges 220A of the first die 220 are pressed against between the grooves 21A of the base material 300A to thereby form a plurality of grooves (second depression portions) 21B in such a fashion that the grooves (the second depression portions) 21B are formed between the adjoining grooves 21A (at a substantial center potion in this embodiment) as illustrated in FIG. 5C. This creates first grooves 21.

By forming the irregularity section 2 by forming the groove 21B between the adjoining second grooves 21A, it becomes possible to form the irregularity section 2 having extremely fine irregularities on the outer peripheral surface of the developing roller 510. The fine irregularities thus formed can have sizes smaller than those that can be obtained by the use of the first die.

This makes it possible to form the irregularity section 2 having extremely fine irregularities having sizes substantially equal to or smaller than those obtained by blast treatment. As a result, the thus obtained developing roller 510 can have improved tumbling capability (ease of tumbling movement) of toner particles on the outer peripheral surface of the developing roller. Further, such a developing roller 510 can carry toner of an extremely uniform amount and achieve extremely excellent electrification and conveyance of the toner.

Due to the fact that the irregularity section 2 is formed by forming the grooves 21B between the grooves 21A, it becomes possible to form the irregularity section 2 having extremely fine irregularities on the outer peripheral surface of the developing roller 510, and the fine irregularities thus formed can have sizes smaller than those that can be obtained by the use of a single die. This makes it possible to form the irregularity section 2 having extremely fine irregularities having sizes substantially equal to or smaller than those obtained by blast treatment. As a result, the thus obtained developing roller 510 can have improved tumbling capability (ease of tumbling movement) of toner particles on the outer peripheral surface of the developing roller. Further, such a developing roller 510 can carry toner of an extremely uniform amount and achieve extremely excellent electrification and conveyance of the toner.

Inasmuch as the die used in forming the groove 21A as the first depression portions is the same as the die used in forming the groove 21B as the second depression portions, it is possible to form the irregularity section 2 of a uniform pattern in more reliable manner. Furthermore, it is possible to reduce the costs incurred in connection with the dice, as a result of which the developing roller 510 can be obtained in a cost-effective manner.

On the other hand, the irregularity section 2 can be formed even if the die used in forming the grooves 21A as the first depression portions is different from the die used in forming the grooves 21B as the second depression portions. In this case, it is preferred that a plurality of projection portions for formation of the grooves 21A are formed at a first pitch on the die used in forming the grooves 21A, and a plurality of projection portions for formation of the grooves 21B are formed at a second pitch n times or 1/n times greater than the first pitch on the die used in forming the grooves 21B, where the "n" is a natural number. By appropriately combining the shape of the die for formation of the grooves 21A and the shape of the die for formation of the grooves 213, it becomes possible to form the irregularity section 2 into a desired shape and also to increase the degree of design freedom of the irregularity section 2 obtained.

Once the irregularity section 2 is formed by use of the dice in this way, the surface of the irregularity section 2 may be subjected to plating treatment, if needed. This further enhances the mechanical strength of the irregularity section 2 obtained.

The plating treatment is not particularly restricted but may be desirably conducted by nonelectrolytic Ni—P plating, electroplating, hard chromium plating or the like. It is preferred that the thickness of the plated layer is in the range of about 2 to 10 μm.

The developing roller 510 can be manufactured in the manner described above.

Such a developing roller 510 and the developing device and the image forming apparatus provided with the developing roller 510 are excellent in developing characteristics and durability.

While the developing agent carrier manufacturing method, the developing agent carrier, the developing device and the image forming apparatus of the present invention have been described hereinabove in respect of the illustrated first embodiment, the present invention is not limited thereto. Individual parts constituting the developing agent carrier, the developing device and the image forming apparatus may be substituted by other arbitrary ones having functional equivalency. It may also be possible to add arbitrary constituent parts.

Although the developing agent carrier and the base material for use in forming the same are of a hollow cylindrical shape in the embodiment set forth above, the developing agent carrier (main body) and the base material may have a solid cylindrical shape.

Furthermore, the shape of the irregularity section formed on the outer peripheral surface of the developing agent carrier is not restricted to the one of the afore-mentioned embodiment but may be changed to an arbitrary one as far as the latter has the function of carrying a developing agent.

In the first embodiment set forth above, the first grooves 21 are adapted to generally orthogonally intersect the second grooves 22. Alternatively, the first grooves 21 and the second grooves 22 may be formed to intersect one another with an acute angle or an obtuse angle.

Although the first grooves 21 and the second grooves 22 are formed through the use of different dice in the afore-mentioned embodiment, it may be possible to create on a single die an irregularity pattern for formation of the grooves 21 and the second grooves 22. In this case, the irregularity pattern may be created on the outer peripheral surface of one of the first die 220 and the second die 230, while the outer peripheral surface of the other die is left flat. The irregularity pattern may also be created on both of the dice.

In the afore-mentioned first embodiment, the task of forming the irregularity section 2 is performed by use of the dice of a disk shape (short solid cylindrical shape) while displacing the base material 300A in its axial direction. Alternatively, the irregularity section 2 may be formed without having to displace the base material 300A in its axial direction, by using solid cylindrical dice whose length is substantially the same as the axial length of a target region of the base material 300A on which the irregularity section 2 is to be formed.

Moreover, the dice used in forming the irregularity section 2 are not restricted to the afore-mentioned ones with a disk shape or a solid cylindrical shape but may have other shapes such as a plate shape or the like.

Hereinbelow, a description will be made with regard to a developing agent carrier manufacturing method, a developing agent carrier manufactured by the method, a developing device provided with the developing agent carrier and an image forming apparatus provided with the developing device according to the second embodiment of the present invention.

The second embodiment is different from the first embodiment only in the structure of the first and second grooves of the developing agent carrier (that is, the developing roller 510A). Therefore, the following description will focus on the difference and the description for the common portions is omitted, and the same reference numerals are used to denote the same elements and structures.

As described above, the developing roller of the second embodiment has the same structure as that of the first embodiment excepting the structure of the first and second grooves shown in FIG. 4.

Figure 9:
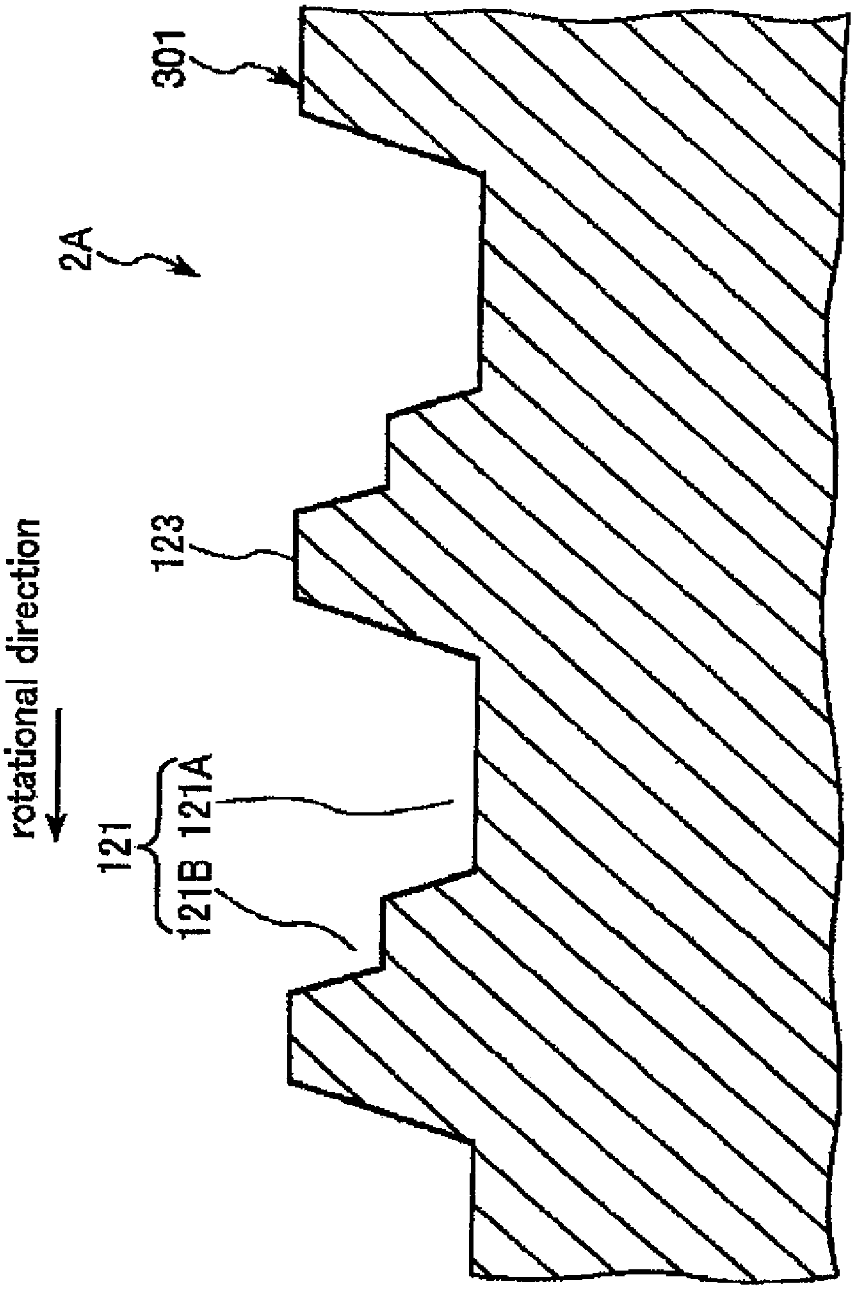
FIG. 9 is an enlarged sectional view of a part of the developing agent carrier for the second embodiment taken along line A-A in FIG. 3.

FIG. 9 is an enlarged sectional view taken along line A-A in FIG. 3. As shown in FIG. 9, in this second embodiment, each of the first grooves 121 has a first depression portion 121A and a second depression portion 121B differing in depth from each other and partially overlapped with each other to form a two-stage groove structure. The second grooves 122 have the same configuration as that of the first grooves 121, except that they extend in the different direction than the first grooves 121 as set forth above. In FIG. 9, the first grooves 121 and the second grooves 122 are schematically shown for the sake of convenience in description.

Furthermore, since the irregularity section 2A has stairs (a multilevel groove structure), the toner can move into and out of the depression portions with ease, thereby improving the tumbling capability of the toner. In this second embodiment, the stairs are formed on only the loading sides of the first grooves 121 and the second grooves 122 of the irregularity section 2A in a rotational direction of the developing roller 510A and no stair is formed on the trailing sides.

In the following, one example of the method for forming the irregularity section 2A according to the second embodiment will be described in more detail. Seeing that the first grooves 121 and the second grooves 122 are formed substantially in the same mariner, only the method of forming the first grooves 121 will be described representatively. The description given below is directed to the case where the irregularity section 2A is formed by performing the pressing operation twice. The number of pressing operation may be three or more.

The step of forming the irregularity section 2A includes a first step of forming a plurality of first depression portions on the outer peripheral surface of the base material 300A by use of a die and a second step of forming a plurality of second depression portions on the outer peripheral surface of the base material 300A by use of a die identical with or differing from the die used in forming the first depression portions, in such a manner that the second depression portions are partially overlapped with the first depression portions.

Figure 10A:
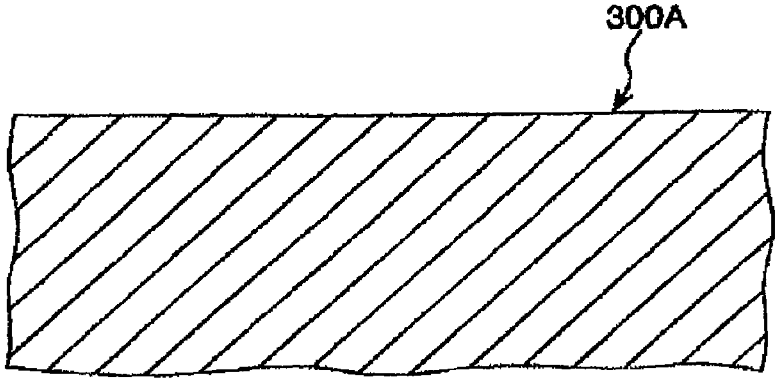
FIG. 10 is a view for explaining a process for forming an irregularity section on an outer peripheral surface of a base material in the method illustrated in FIG. 5 according to the second embodiment.
Figure 10B:
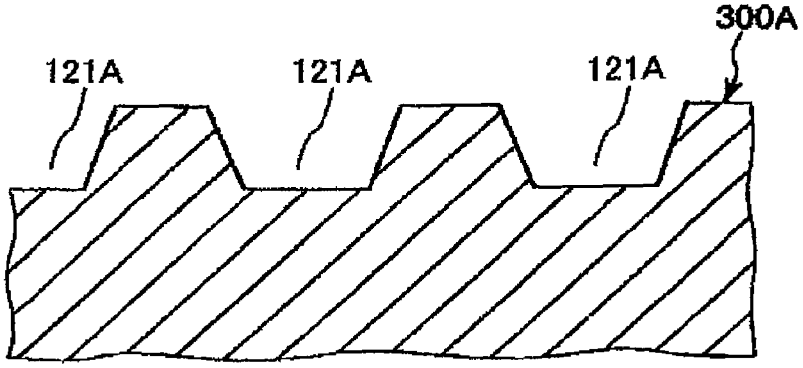

More specifically, in the first pressing operation (the first step), the ridges 220A of the first die 220 are pressed against the outer peripheral surface of the base material 300A shown in FIG. 10A to thereby form a plurality of grooves (first depression portions) 121A with the same pitch as the pitch between the first grooves 121 to be formed, as illustrated in FIG. 10B.

Figure 10C:
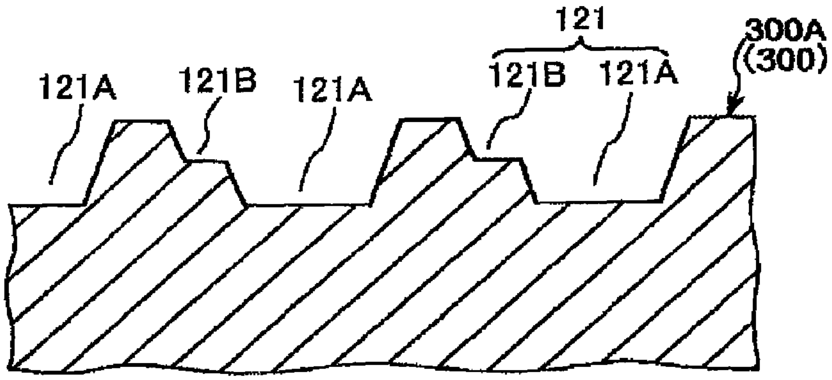

Subsequently, in the second pressing operation (the second step), the ridges 220A of the first die 220 are pressed against between the grooves 121A of the base material 300A to thereby form a plurality of grooves (second depression portions) 121B in such a fashion that the grooves 121B are partially overlapped with the grooves 121A as illustrated in FIG. 10C. This creates first grooves 121.

Thanks to the fact that the irregularity section 2A is formed by forming the grooves 121B, i.e. the second depression portions so as to partially overlap the grooves 121A, i.e., the first depression portions, it is possible to obtain the irregularity section 2A without having to use a die of a complex shape. In particular, since the grooves 121A and the grooves 121B differ in depth from each other, it is possible to form the irregularity section 2A having stairs (a multilevel groove structure). Such an irregularity section 2A allows the toner to easily move into and out of the grooves thereof, thereby enhancing the tumbling capability of the toner.

Inasmuch as the die used in forming the groove 121A as the first depression portions is the same as the die used in forming the groove 121B as the second depression portions, it is possible to form the irregularity section 2A of a uniform pattern in more reliable manner. Furthermore, it is possible to reduce the costs incurred in connection with the dice, as a result of which the developing roller 510A can be obtained in a cost-effective manner.

Since the grooves 121B are formed after formation of the grooves 121A in the irregularity section forming step and since the grooves 121B are smaller in depth than the grooves 121A, it is possible to reduce the pressing force required in the second step, thereby easing the formation of the irregularity section 2A.

In this embodiment, due to the fact that the grooves 121B are formed to partially overlap with the leading sides of the grooves 121A in the rotational direction of the developing roller 510A, the toner in the irregularity section 2A can move out in an easier manner, thereby more reliably enhancing the tumbling capability of the toner. Particularly, it is possible to provide a configuration in which stairs are formed only on the leading sides of the grooves 121A of the irregularity section 2A in the rotational direction of the developing roller 510A and no stair is formed on the trailing sides of the grooves 121A of the irregularity section 2A.

On the other hand, the irregularity section 2A can be formed even if the die used in forming the grooves 121A as the first depression portions is made different from the die used in forming the grooves 121B as the second depression portions. In this case, it is preferred that a plurality of projection portions for formation of the grooves 21A are formed at a first pitch on the die used in forming the grooves 121A, and a plurality of projection portions for formation of the grooves 121B are formed at a second pitch n times or 1/n times greater than the first pitch on the die used in forming the grooves 121B, where the "n" is a natural number. By appropriately combining the shape of the die for formation of the grooves 121A and the shape of the die for formation of the grooves 121B, it becomes possible to form the irregularity section 2A into a desired shape and also to increase the degree of design freedom of the irregularity section 2A obtained.

In this regard, it is preferred that the second pitch is equal to the first pitch. This makes it possible to uniform the shape of the depression portions and the shape of the protrusion portions of the irregularity section 2A in more reliable manner.

It is also preferred that the ridges (projection portions) 230A of the second die 230 are smaller in height than the ridges (projection portions) 220A of the first die 220. This makes it possible to form the irregularity section 2A having stairs (a two-stage groove structure) in, a simplified manner. Furthermore, due to the fact that the protrusion portions 123 of the irregularity section 2A are pressed in the second step by recess portions of the die used in forming the grooves 121B (second depression portions), the protrusion portions 123 of the irregularity section 2A can enjoy increased mechanical strength. As a result, the developing roller 510A obtained shows enhanced durability.

Once the irregularity section 2A is formed by use of the dice in this way, the surface of the irregularity section 2A may be subjected to plating treatment, if needed. This further enhances the mechanical strength of the irregularity section 2A obtained.

The plating treatment is not particularly restricted but may be desirably conducted by nonelectrolytic Ni—P plating, electroplating, hard chromium plating or the like. It is preferred that the thickness of the plated layer is in the range of about 2 to 10 μm.

The developing roller 510A can be manufactured in the manner described above.

Such a developing roller 510A and the developing device and the image forming apparatus provided with the developing roller 510A are excellent in developing characteristics and durability.

While the developing agent carrier of the second embodiment of the present invention has been described hereinabove in respect of the illustrated example, the second embodiment is not limited thereto. For example, individual parts constituting the developing agent carrier may be substituted by other arbitrary ones having functional equivalency. It may also be possible to add arbitrary constituent parts.

Although the developing agent carrier and the base material for use in forming the same are of a hollow cylindrical shape in the example set forth above, the developing agent carrier (main body) and the base material may have a solid cylindrical shape (rod-like member) shown in FIG. 3.

Furthermore, the shape of the irregularity section formed on the outer peripheral surface of the developing agent carrier is not restricted to the one of the afore-mentioned embodiment but may be changed to an arbitrary one as far as the latter has the function of carrying a developing agent. No problem exists if the irregularity section is formed by use of dice in such a fashion that the second depression portions are partially overlapped with the first depression portions. In this case, the shape of the irregularity section obtained may be arbitrarily set by properly selecting the shape, size and depth of each of the first depression portions and the second depression portions and the overlapping amount of the second depression portions with the first depression portions. This makes it possible to obtain an irregularity section having desired characteristics.

In the embodiment set forth above, the first grooves 121 are adapted to generally orthogonally intersect the second grooves 122. Alternatively, the first grooves 121 and the second grooves 122 may be formed to intersect one another with an acute angle or an obtuse angle.

Although the first grooves 121 and the second grooves 122 are form ed through the use of different dice in the afore-mentioned embodiment, it may be possible to create on a single die an irregularity pattern for formation of the grooves 121 and the second grooves 122. In this case, the irregularity pattern may be created on the outer peripheral surface of one of the first die 220 and the second die 230, while the outer peripheral surface of the other die is left flat. The irregularity pattern may also be created on both of the dice.

In the afore-mentioned embodiment, the task of forming the irregularity section 2A is performed by use of the dice of a disk shape (short solid cylindrical shape) while displacing the base material 300A in its axial direction. Alternatively, the irregularity section 2A may be formed without having to displace the base material 300A in its axial direction, by using solid cylindrical dice whose length is substantially the same as the axial length of a target region of the base material 300A on which the irregularity section 2A is to be formed.

Moreover, the dice used in forming the irregularity section 2A are not restricted to the afore-mentioned ones with a disk shape or a rod-like shape but may have other shapes such as a plate shape or the like.

Hereinbelow, a description will be made with regard to the third embodiment of the present invention.

The third embodiment is different from the first and second embodiments only in the structure of the first and second grooves of the developing agent carrier, that is, the region of the outer peripheral surface of the base material in which the irregularity section is formed. Therefore, the following description will focus on the difference and the description for the common portions is omitted, and the same reference numerals are used to denote the same elements and structures.

As described above, the developing roller of the third embodiment has the same structure as that of the first embodiment shown in FIG. 3 excepting the structure of the first and second grooves.

Figure 11:
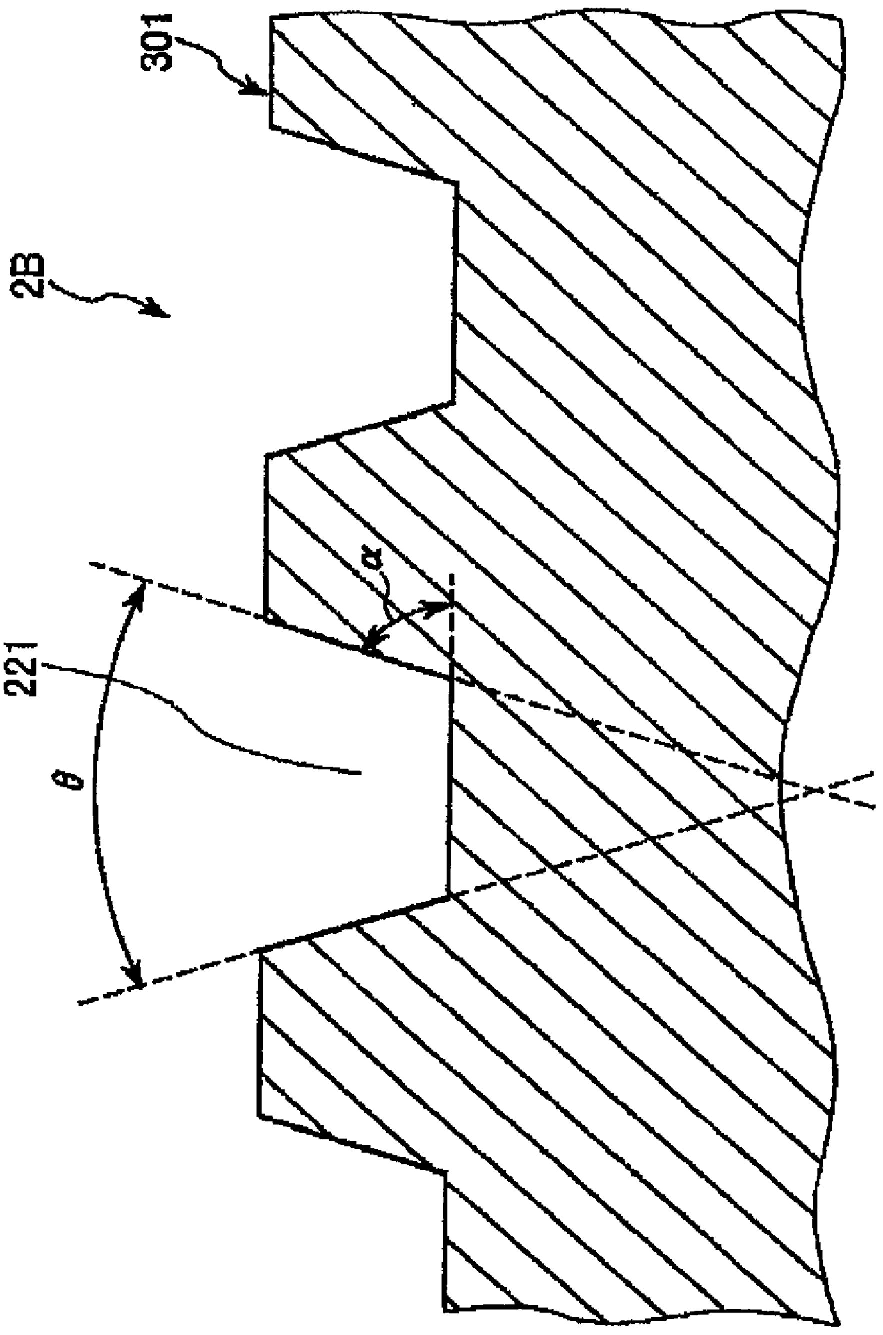
FIG. 11 is an enlarged sectional view of a part of the developing agent carrier for the third embodiment taken along line A-A in FIG. 3.

FIG. 11 is an enlarged sectional view taken along line A-A in FIG. 3. As shown in FIG. 11, each of the first grooves 221 is formed to have a cross-section of a trapezoidal shape. The second grooves 222 have the same configuration as that of the first grooves 221, except that they extend in the different direction than the first grooves 221 as is the same with the first embodiment. In FIG. 11, the first grooves 221 and the second grooves 222 are schematically shown for the sake of convenience in description.

As shown in FIG. 11, each of the grooves 221, 222 is defined by inclined side surfaces. The angle θ defined by the inclined side surfaces is preferably in the range of 80 to 130°, and more preferably in the range of 90 to 120°. This makes it possible for the developing roller 510B to carry an appropriate amount of toner. Further, such grooves can be formed with a relatively small pressure in the manufacturing process, it is possible to suppress deformation of the hollow cylindrical shape base material.

Figure 12:
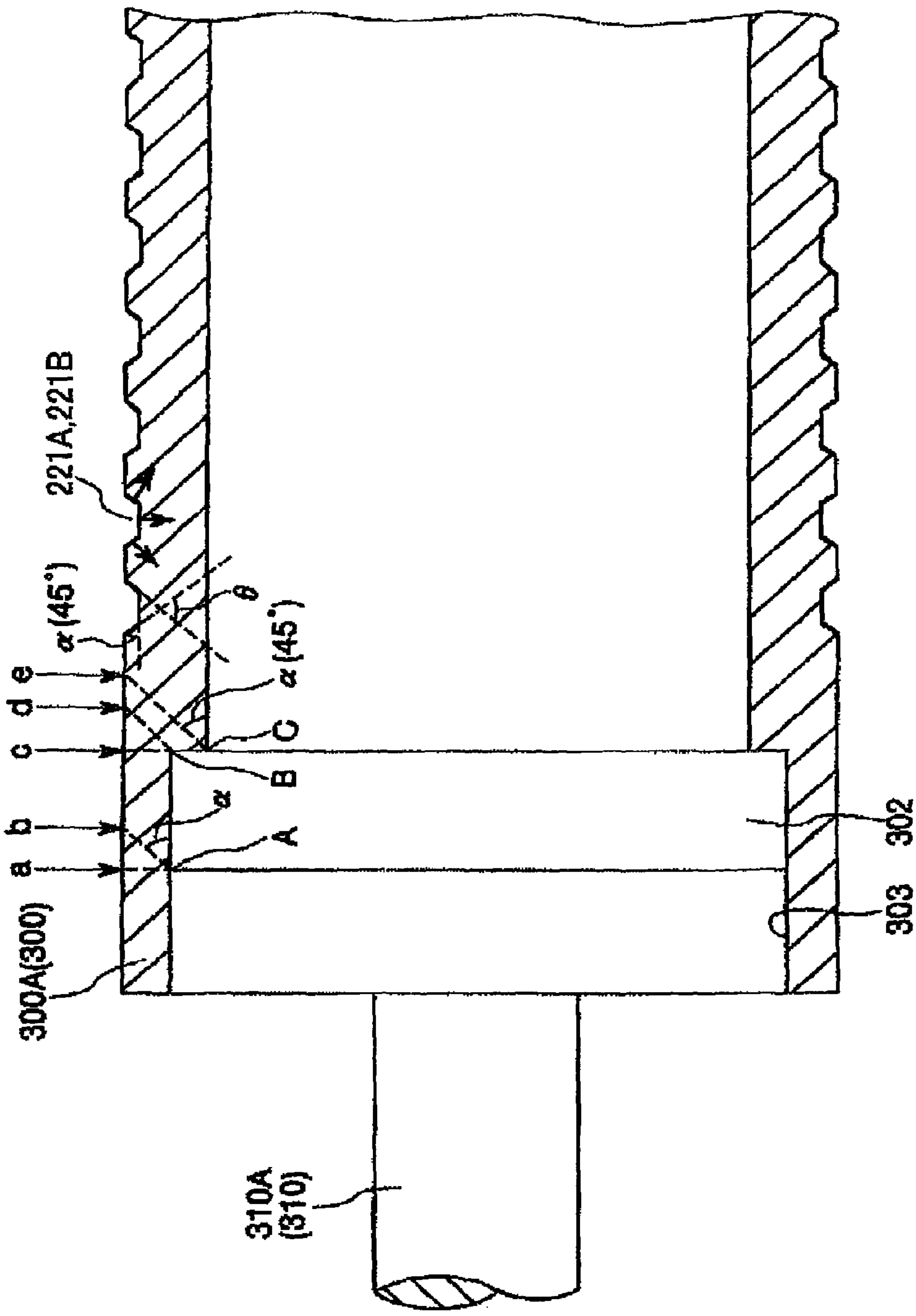
FIG. 12 is an illustration for explaining a region on the outer peripheral surface of the base material in which an irregularity section is formed in accordance with the manufacturing method of the third embodiment shown in FIG. 5.

FIG. 12 is an illustration for explaining a region on the outer peripheral surface of the base material 300A in which the irregularity section is formed in accordance with the manufacturing method shown in FIG. 5. As shown in FIG. 12, the developing roller 510B is formed into a hollow cylindrical shape having an outer peripheral surface, and an irregularity section 2B is formed on the outer peripheral surface to carry a developing agent. Further, flange members 310A are respectively fitted into openings 302 defined by inner circumferential surfaces at both end portions in an axial direction of the base material 300A of the hollow cylindrical shape which is to become the developing agent carrier. More specifically, each of the end portions of the base material 300A is formed into a thinner thickness part 302 which is formed by enlarging the inner diameter of each end portion for receiving the corresponding flange 31A. The thinner thickness part is defined by an inner step portion at a position opposite to the flange member, and the inner step portion is defined by a large diameter annular edge "B" and a small diameter annular edge "C".

The irregularity section 2B is formed by pressing dice for formation of the irregularity section 23 against the outer peripheral surface of the base material 300A. The irregularity section 2B includes a number of depression portions.

A region in which the irregularity section 2B is formed is a portion of the outer peripheral surface of the base material 300A which extends from a contacting part between the inner circumferential surface 302 of the base material 300A and the outer peripheral surface of each of the flange members 310A toward a central portion of the base material 300A in the axial direction thereof to the other contacting part (on the region of the outer peripheral surface which lies in the right side of the point "a" in FIG. 12, that is, on the region that lies between the contacting parts). In other words, the irregularity section 2B is formed on the region of the outer peripheral surface of the base material 300A other than portions of the base material 300A having high rigidity due to the support by the flange members 310 from the inside thereof, that is, the irregularity section 2B is formed on the region of the outer peripheral surface of the base material 300A having relatively uniform rigidity.

With this structure, it is possible to suppress localized or sudden changes in the amount to deformation of the base material 300A, when the outer peripheral surface of the base material 300A is pressed with the dies (the first die 220 and/or the second die 230). As a result, it is possible to form the irregularity section 2B having uniform irregularities on the outer peripheral surface of the base material 300A. Further, it is also possible to provide a developing roller 510B having excellent properties by preventing deformation (plastic deformation) of the base material 300A. Note that FIG. 11 shows the case that the angle "α" is 45°.

Further, in the process of the formation of the irregularity section 2B, it is preferred that the irregularity section 2B includes a number of depression portions in which a depression portion closest to each of the flange members (that is, the outermost depression) has a side surface positioned on the side of the corresponding flange neither 310, and each of the closest depression portions of the irregularity section 2B which is closest to each of the flange members 310 is formed at a position on the outer peripheral surface of the base material 300A in which a line perpendicular to the side surface of the depression portion and extending toward an axial line of the base material 300A passes inside the inner annular edge "A" of the contacting part in a longitudinal cross-section of the base material 300A, and the region in which the irregularity section 21 is formed lies between the closest (outermost) depression portions.

In other words, it is preferred that the irregularity section 2B is formed on a region of the outer peripheral surface of the base material 300A which lies between each of the points "b" which is an intersection of a line extending from the annular edge "A" at an inclined angle "α" and the outer peripheral surface of the base material 300A (right side of the point "b" in FIG. 12, that is, on the region that lies between the points "b" of the opposite sides of the outer peripheral surface of the base material 300A). This makes it possible to form the irregularity section 28 having uniform irregularities on the outer peripheral surface of the base material 300A while preventing deformation (plastic deformation) of the base material 300A reliably. In this connection, the angle "α" is an inclined angle of each of the inclined side surfaces of the groove of the first grooves 221 and/or second grooves 222. In other words, the angle "α" is an angle represented by the equation of (180°—(the angle "θ" defined by the inclined side surfaces of the groove of the first grooves 221 and/or the second grooves 222))/2.

Further, as described above, in the process of the formation of the irregularity section 2B, each of the end portions of the base material 300A is formed into the thinner thickness part 302 which is formed by enlarging the inner diameter of each end portion for receiving the corresponding flange 310. The thinner thickness part 302 is defined by an inner step portion at a position opposite to the flange member 310, and the inner step portion 302 is defined by the large diameter annular edge "B" and the small diameter annular edge "C". In this configuration, it is preferred that the irregularity section 2B is formed so that each of the closest depression portions (that is, the outermost depression) is formed at a position on the outer peripheral surface of the base material in which a line perpendicular to the side surface of the depression portion and extending toward the axial line of the base material 300A passes inside the large diameter annular edge "B" of the inner step portion in a longitudinal cross-section of the base material, and the region in which the irregularity section 2B is formed lies between the closest depression portions.

In other words, it is preferred that the irregularity section 2B is formed on a region of the outer peripheral surface of the base material 300A which lies between each of the points "d" which is an intersection of a line extending from the annular edge "B" at an inclined angle "α" and the outer peripheral surface of the base material 300A (right side of the point "d" in FIG. 12, that is, on the region that lies between the points "d" of the opposite sides of the outer peripheral surface of the base material 300A). This makes it possible to form the irregularity section 2B having uniform irregularities on the outer peripheral surface of the base material 300A and prevent deformation (plastic deformation) of the base material 300A more reliably in this connection, it is to be noted that in the case where the irregularity section 2B is formed on a region of the outer peripheral surface of the base material 300A which lies between the points "c" corresponding to the annular edges "B", a certain advantage can be obtained.

Furthermore, it is also preferred that each of the closest depression portions is formed at a position on the outer peripheral surface of the base material in which a line perpendicular to the side surface of the depression portion and extending toward the axial line of the base material passes inside the small diameter annular edge "C" of the inner step portion on the inner circumferential surface of the base material 300A, and the region in which the irregularity section 2B is formed lies between the closest depression portions.

In other words, it is preferred that the irregularity section 28 is formed on a region of the outer peripheral surface of the base material 300A which lies between each of the points "e" which is an intersection of a line extending from the annular edge "C" at an inclined angle "α" and the outer peripheral surface of the base material 300A (right side of the point "e" in FIG. 12, that is, on the region that lies between the points "e" of the opposite sides of the outer peripheral surface of the base material 300A). This also makes it possible to form the irregularity section 2B having uniform irregularities on the outer peripheral surface of the base material 300A and prevent deformation (plastic deformation) of the base material 300A more reliably.

In summary, in view of the advantages of being capable of forming the irregularity section 2B having uniform irregularities on the outer peripheral surface of the base material 300A and preventing deformation (plastic deformation) of the base material 300A, the opposite outermost positions of the depression portions of the irregularity section 2B are preferably set to be any one of the positions of "e", "d", "c", "b" and "a" shown in FIG. 12, and greater advantages can be obtained in this order.

Once the irregularity section 2B is formed by use of the dice in this way, the surface of the irregularity section 2B may be subjected to plating treatment, if needed. This further enhances the mechanical strength of the irregularity section 2B obtained.

The plating treatment is not particularly restricted but may be desirably conducted by nonelectrolytic Ni—P plating, electroplating, hard chromium plating or the like. It is preferred that the thickness of the plated layer is in the range of about 2 to 10 μm.

The developing roller 510B can be manufactured in the manner described above.

Hereinbelow, a description will be made with regard to the modification of the third embodiment.

This modification has the same structure as that of the third embodiment excepting the structure of the flange members 310 and the structure of a part of the base material 300A. Therefore, the following description will focus on the differences and the description for the common portions is omitted.

Figure 13:
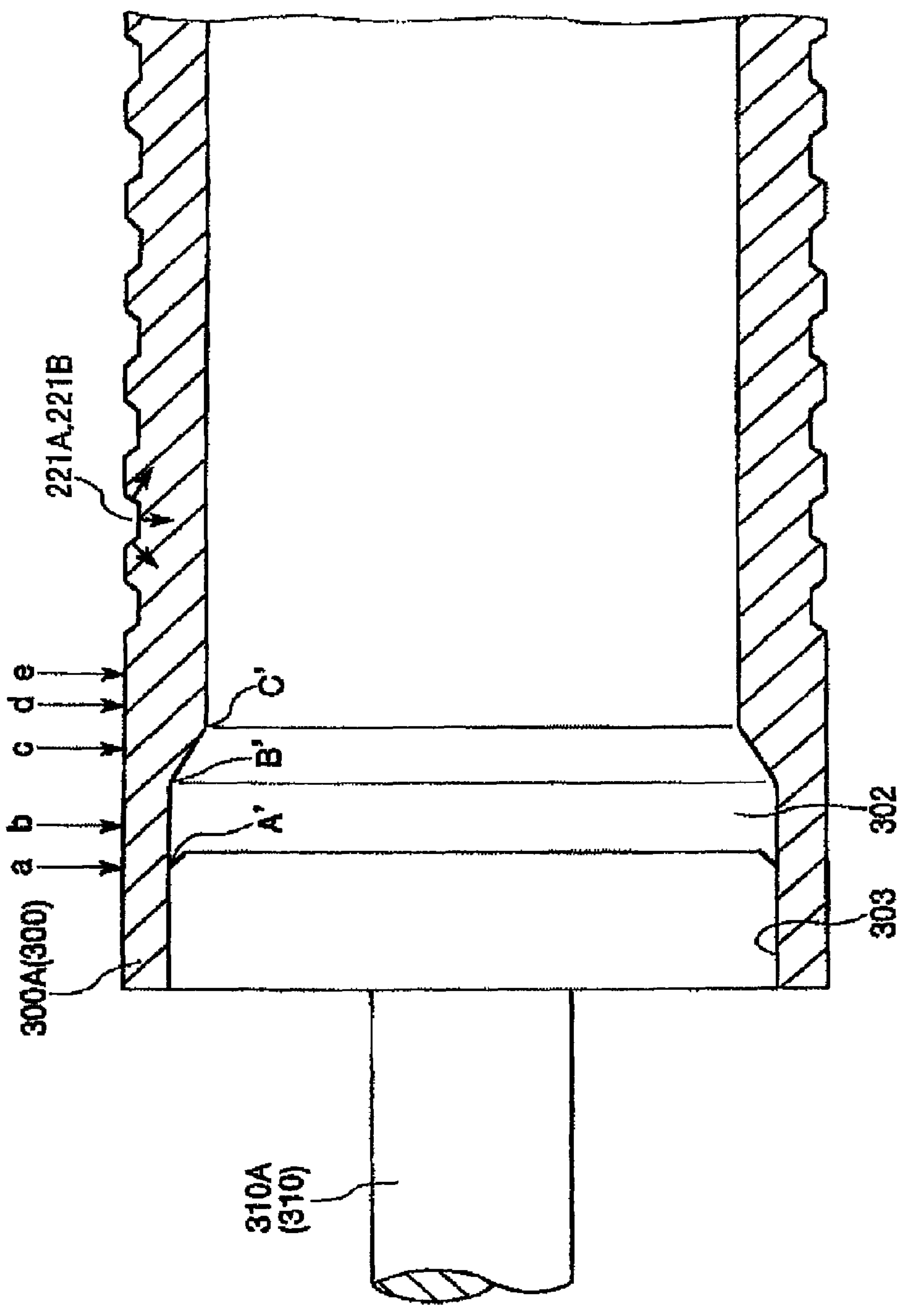
FIG. 13 is also an illustration for explaining a region on the outer peripheral surface of the base material in which an irregularity section is formed in accordance with the modification of the manufacturing method of the third embodiment.

FIG. 13 is an illustration for explaining a region of the outer peripheral surface of the base material 300A in which the irregularity section 2B is formed.

As shown in FIG. 13, each of the end portions of the base material 300A is formed into a thinner thickness part 302 which is formed by enlarging the inner diameter of the end portion to form an opening for receiving the corresponding flange 310, wherein the thickness of the base material 300A changes from each of the thinner thickness parts 302 thereof toward other portion of the base material 300A having larger thickness than that of the thinner thickness parts 302 thereof gradually. With this structure, it is possible to avoid sudden or localized changes in the rigidity of the base material 300A at the boundary between each thinner thickness part 302 and the other part of the base material 300A and its vicinity which is disadvantage in forming the irregularity section 2B as described above. Therefore, even in the case where the thinner thickness part 302 is formed in the base material 300A for receiving the corresponding flange 310, it is possible to form the irregularity section 2B having uniform irregularities on the outer peripheral surface of the base material 300A. Further, it is also possible to prevent deformation (plastic deformation) of the base material 300A while being capable of increasing an area of a region in which the irregularity section 2B is formed. In this connection, it is to be noted that the base material may be constructed so that the thickness of the base material is increased from the thinner thickness part to the larger thickness part of the base material 300A in a stepwise manner.

Further, in this modification, the flange portion 310A has a configuration so that the diameter of the inner end portion is gradually decreased toward the end surface thereof (that is, the inner end portion is chamfered or the edge there of is rounded). With this structure, it is also possible to avoid sudden or localized changes in the rigidity of the base material 300A at the boundary and its vicinity between each contacting part at which the outer circumferential surface of the flange member 310A is in contact with the inner circumferential surface of the thinner thickness part 302 and the other portion of the base material 300A. This also contributes to the formation of the irregularity section 26 having uniform irregularities on the outer peripheral surface of the base material 300A while being capable of preventing deformation (plastic deformation) of the base material 300A.

Furthermore, please note that in FIG. 13 the portions designated by "A'", "B'" and "C'" substantially correspond to the portions "A", "B" and "C" in FIG. 12, substantially the same advantages can be obtained by changing the positions of the outermost depression portions which define the irregularity section 2B.

Such a developing roller 510B and the developing device and the image forming apparatus provided with the developing roller 510B are excellent in developing characteristics and durability.

While the developing agent carrier manufacturing method, the developing agent carrier, the developing device and the image forming apparatus of the present invention have been described hereinabove in respect of the illustrated third embodiment and its modification, the present invention is not limited thereto. Namely, as is the same with the first and second embodiments, individual parts constituting the developing agent carrier, the developing device and the image forming apparatus may be substituted by other arbitrary ones having functional equivalency. It may also be possible to add arbitrary constituent parts.

Further, as is the same with tho first and second embodiments, the shape of the irregularity section formed on the outer peripheral surface of the developing agent carrier may be changed to an arbitrary one as far as the latter has the function of carrying a developing agent. Furthermore, the first grooves 221 and the second grooves 222 may be through using a single die having an irregularity pattern for formation of the grooves 221 and the second grooves 222. In this case, the irregularity pattern may be created on the outer peripheral surface of one of the first die 220 and the second die 230, while the outer peripheral surface of the other die is left flat. The irregularity-pattern may also be created on both of the dice. Moreover, the irregularity section 2 may be formed without having to displace the base material 300A in its axial direction, by using a solid cylindrical dice whose length is substantially the same as the axial length of a target region of the base material 300A on which the irregularity section 2 is to be formed. Moreover, the dice used in forming the irregularity section 2 are not restricted to the afore-mentioned ones with a disk shape or a solid cylindrical shape but may have other shapes such as a plate shape or the like.

What is claimed is:

1. A method for manufacturing a developing agent carrier of a hollow or solid cylindrical shape having an outer peripheral surface and an irregularity section formed on the outer peripheral surface to carry a developing agent, comprising:

a step of preparing a base material of a hollow or solid cylindrical shape which is to become the developing agent carrier, the base material having an outer peripheral surface; and a step of forming the irregularity section by pressing dice for formation of the irregularity section against the outer peripheral surface of the base material, wherein the irregularity section forming step comprises a first step of forming a plurality of first depression portions on the outer peripheral surface of the base material by use of a die and a second step of forming a plurality of second depression portions on the outer peripheral surface of the base material by use of a die identical with or different from the die used in forming the first depression portions, in such a manner that the second depression portions are smaller in depth than the first depression portions, and the second depression portions are partially overlapped with the first depression portions to form a two-stage groove structure.

2. The method for manufacturing a developing agent carrier as claimed in claim 1, wherein the second depression portions are formed between the first depression portions.

3. The method for manufacturing a developing agent carrier as claimed in claim 2, wherein the die used in forming the first depression portions is identical with the die used in forming the second depression portions.

4. The method for manufacturing a developing agent carrier as claimed in claim 2, wherein the die used in forming the first depression portions differs from the die used in forming the second depression portions, a plurality of projection portions for formation of the first depression portions are formed at a first pitch on the die used in forming the first depression portions, and a plurality of projection portions for formation of the second depression portions are formed at a second pitch n times or 1/n times greater than the first pitch on the die used in forming the second depression portions, where the "n" is a natural number.

5. The method for manufacturing a developing agent carrier as claimed in claim 2, wherein the irregularity section is comprised of a plurality of first grooves extending in a mutually parallel relationship and a plurality of second grooves intersecting the first grooves and extending in a mutually parallel relationship.

6. The method for manufacturing a developing agent carrier as claimed in claim 5, wherein if the pitch between the first grooves and the pitch between the second grooves are defined as "p", the P is smaller than the pitch of a resolving power employed.

7. The method for manufacturing a developing agent carrier as claimed in claim 5, wherein if the depth of the first grooves and the second grooves is defined as "D" and if the average particle size of the developing agent is defined as "d", Did is equal to 0.5 to 2.

8. The method for manufacturing a developing agent carrier as claimed in claim 5, wherein if the width of the first grooves and the second grooves is defined as "W" and if the average particle size of the developing agent is defined as "d", WM is equal to 2 to 20.

9. The method for manufacturing a developing agent carrier as claimed in claim 1, wherein the second depression portions are formed after the formation of the first depression portions in the irregularity section forming step.

10. A developing agent carrier manufactured by the method defined by claim 1.

11. A developing device provided with the developing agent carrier defined by claim 10, the developing agent carrier arranged in contact with or in proximity with a latent image carrier for carrying a latent image in a confronting relationship, the developing device adapted to visualize the latent image as a developing agent image by applying a developing agent from the developing agent carrier to the latent image carrier.

12. The method for manufacturing a developing agent carrier:

as claimed in claim 1, wherein in the preparing step, flange members are prepared in addition to the base material of the hollow cylindrical shape having an inner circumferential surface and openings defined by the inner circumferential surface at both end portions in an axial direction thereof, and the method further comprises a step of fitting respectively the flange members into the openings of the base material between the preparing step and the irregularity section forming step, and a region in which the irregularity section is formed is a portion of the outer peripheral surface of the base material which extends from a contacting part between the inner circumferential surface of the base material and an outer circumferential surface of each of the flange members toward a central portion of the base material in the axial direction thereof.

13. The method for manufacturing a developing agent carrier as claimed in claim 12, wherein each of the end portions of the base material is formed into a thinner thickness part that is formed by enlarging the inner diameter of the end portion for receiving the corresponding flange, and the thickness of the base material changes from each of the thinner thickness parts thereof toward other portion of the base material than the thinner thickness parts thereof gradually or in a stepwise manner.

14. The method for manufacturing a developing agent carrier as claimed in claim 12, wherein each of the flange members has an inner end portion, and the cross sectional area of the inner end portion is gradually decreased in an insertion direction thereof.

15. The method for manufacturing a developing agent carrier as claimed in claim 1, wherein the irregularity section is comprised of a plurality of first grooves extending in a mutually parallel relationship and a plurality of second grooves intersecting the first grooves and extending in mutually parallel relationship, each of the first grooves and the second grooves having the number of depression portions, and if the angle defined by the side surfaces of each of the first grooves and/or the second grooves is defined as "θ", the angle "θ" is in the range of 80 to 130°.

16. The method for manufacturing a developing agent carrier as claimed in claim 12, wherein the contacting part between the inner circumferential surface of the base material and the outer circumferential surface of each of the flange members has an inner annular edge portion, the irregularity section includes a number of depression portions in which a depression portion closest to each of the flange members has an inclined side surface positioned on the side of the corresponding flange member, and each of the closest depression portions is formed at a position on the outer peripheral surface of the base material in which a line perpendicular to the inclined side surface of the depression portion and extending toward an axial line of the base material passes inside the inner annular edge of the contacting part in a longitudinal cross-section of the base material, and the region in which the irregularity section is formed lies between the closest depression portions.

17. The method for manufacturing a developing agent carrier as claimed in claim 12, wherein each of the end portions of the base material is formed into a thinner thickness part which is formed by enlarging the inner diameter of each end portion for receiving the corresponding flange member, the thinner thickness part is defined by an inner step portion at a position opposite to the flange member, and the inner step portion being defined by a large diameter annular edge and a small diameter annular edge which are located inside each flange member, and the irregularity section includes a number of depression portions in which a depression portion closest to each of the flange members has an inclined side surface positioned on the side of the corresponding flange member, and wherein each of the closest depression portions is formed at a position on the outer peripheral surface of the base material in which a line perpendicular to the inclined side surface of the depression portion and extending toward the axial line of the base material passes inside the large diameter annular edge of the inner step portion in a longitudinal cross-section of the base material, and the region in which the irregularity section is formed lies between the closest depression portions.

18. The method for manufacturing a developing agent carrier as claimed in claim 16, wherein each of the closest depression portions is formed at a position on the outer peripheral surface of the base material in which a line perpendicular to the inclined side surface of the depression portion and extending toward the axial line of the base material passes inside the small diameter annular edge of the inner step portion on the inner circumferential surface of the base material, and the region in which the irregularity section is to be formed lies between the closest depression portions.

* * * * *

UNITED STATES PATENT AND TRADEMARK OFFICE

CERTIFICATE OF CORRECTION

PATENT NO. : 8,087,170 B2
APPLICATION NO. : 11/561213
DATED : January 3, 2012
INVENTOR(S) : Noboru Sakurai et al.

It is certified that error appears in the above-identified patent and that said Letters Patent is hereby corrected as shown below:

On the title page item (75) the word “Azamimo, JP” should be corrected to read --Azumino, JP--

Signed and Sealed this
Twenty-first Day of August, 2012

David J. Kappos

David J. Kappos
*Director of the United States Patent and Trademark Office*